United States Patent
Malhotra

(10) Patent No.: US 11,683,746 B2
(45) Date of Patent: *Jun. 20, 2023

(54) WIRELESS DATA SERVICE BASED ON GEOGRAPHIC DATA NETWORK NAMES

(71) Applicant: T-Mobile Innovations LLC, Overland Park, KS (US)

(72) Inventor: Rajil Malhotra, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,030

(22) Filed: Sep. 7, 2021

(65) Prior Publication Data

US 2022/0141759 A1 May 5, 2022

Related U.S. Application Data

(63) Continuation of application No. 17/089,420, filed on Nov. 4, 2020, now Pat. No. 11,140,618.

(51) Int. Cl.
*H04W 60/04* (2009.01)
*H04W 48/00* (2009.01)

(52) U.S. Cl.
CPC ........... *H04W 48/17* (2013.01); *H04W 60/04* (2013.01)

(58) Field of Classification Search
CPC .............................. H04W 48/17; H04W 60/04
See application file for complete search history.

(56) References Cited

U.S. PATENT DOCUMENTS

| | | | |
|---|---|---|---|
| 8,509,200 B2 | 8/2013 | Li et al. | |
| 10,674,469 B2 | 6/2020 | Kim et al. | |
| 10,764,935 B2 | 9/2020 | Stammers et al. | |
| 11,252,646 B1 * | 2/2022 | Marupaduga | H04W 16/26 |
| 2018/0199240 A1 | 7/2018 | Dao et al. | |
| 2019/0124561 A1 | 4/2019 | Faccin et al. | |
| 2019/0373441 A1 | 12/2019 | Ryu et al. | |
| 2020/0014762 A1 | 1/2020 | Li et al. | |
| 2020/0077356 A1 | 3/2020 | Youn et al. | |
| 2020/0092710 A1 | 3/2020 | Kim et al. | |
| 2020/0120570 A1 | 4/2020 | Youn et al. | |

FOREIGN PATENT DOCUMENTS

WO 2018131984 A1 7/2018

* cited by examiner

*Primary Examiner* — Michael T Vu

(57) ABSTRACT

A wireless communication network serves a User Equipment (UE) based on a Data Network Name (DNN). An Access and Mobility Management Function (AMF) receives initial signaling for the UE and selects a current Session Management Function (SMF) to serve the UE for the DNN responsive to the initial signaling. The current SMF serves the UE for the DNN. The AMF detects when the UE enters a geographic area while using the DNN. The current SMF transfers a wireless reattach instruction for the DNN to the UE responsive to the detection of the UE entering the geographic area while using the DNN. The AMF receives new signaling for the UE responsive to the wireless reattach instruction and selects a new SMF to serve the UE for the DNN responsive to the new signaling. The new SMF serves the UE for the DNN.

20 Claims, 13 Drawing Sheets

WIRELESS DATA SERVICE BASED ON GEOGRAPHIC DATA NETWORK NAMES

RELATED CASES

This United States Patent Application is a continuation of U.S. patent application Ser. No. 17/089,420 that was filed on Nov. 4, 2020 and is entitled "WIRELESS DATA SERVICE BASED ON GEOGRAPHIC DATA NETWORK NAMES." U.S. patent application Ser. No. 17/089,420 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

A wireless network core controls a data session for a wireless user device by selecting parameters like Data Network Name (DNN), slice Identifier (ID), Quality-of-Service Flow Identifier (QFI), and network addresses. The wireless user device and the wireless access node use the DNN, slice ID, QFI, and network addresses to wirelessly exchange data. The wireless access node and the wireless network core also use the DNN, slice ID, QFI, and network addresses to exchange the data.

As a wireless user device moves around, the wireless user device detaches from a serving wireless access node and attaches to a target wireless access node. During these device handovers, the source and target wireless access nodes interact with the wireless network core to exchange the parameters like DNN, slice ID, QFI, and network addresses. In some examples, the wireless network core selects new network addresses for the wireless user device in response to a handover. In some examples, the wireless network core selects a new mobility anchor for the wireless user device in response to a handover. The mobility anchor serves as a secure gateway for the mobile user devices to external data systems like the internet and content servers.

Unfortunately, the wireless network cores do not efficiently and effectively select new mobility anchors in response to user handovers. Moreover, the wireless network cores do not optimize their mobility anchors for their geographic areas and other parameters.

TECHNICAL OVERVIEW

A wireless communication network serves a User Equipment (UE) based on a Data Network Name (DNN). An Access and Mobility Management Function (AMF) receives initial signaling for the UE and selects a current Session Management Function (SMF) to serve the UE for the DNN responsive to the initial signaling. The current SMF serves the UE for the DNN. The AMF detects when the UE enters a geographic area while using the DNN. The current SMF transfers a wireless reattach instruction for the DNN to the UE responsive to the detection of the UE entering the geographic area while using the DNN. The AMF receives new signaling for the UE responsive to the wireless reattach instruction and selects a new SMF to serve the UE for the DNN responsive to the new signaling. The new SMF serves the UE for the DNN.

DETAILED DESCRIPTION

Figure 1:
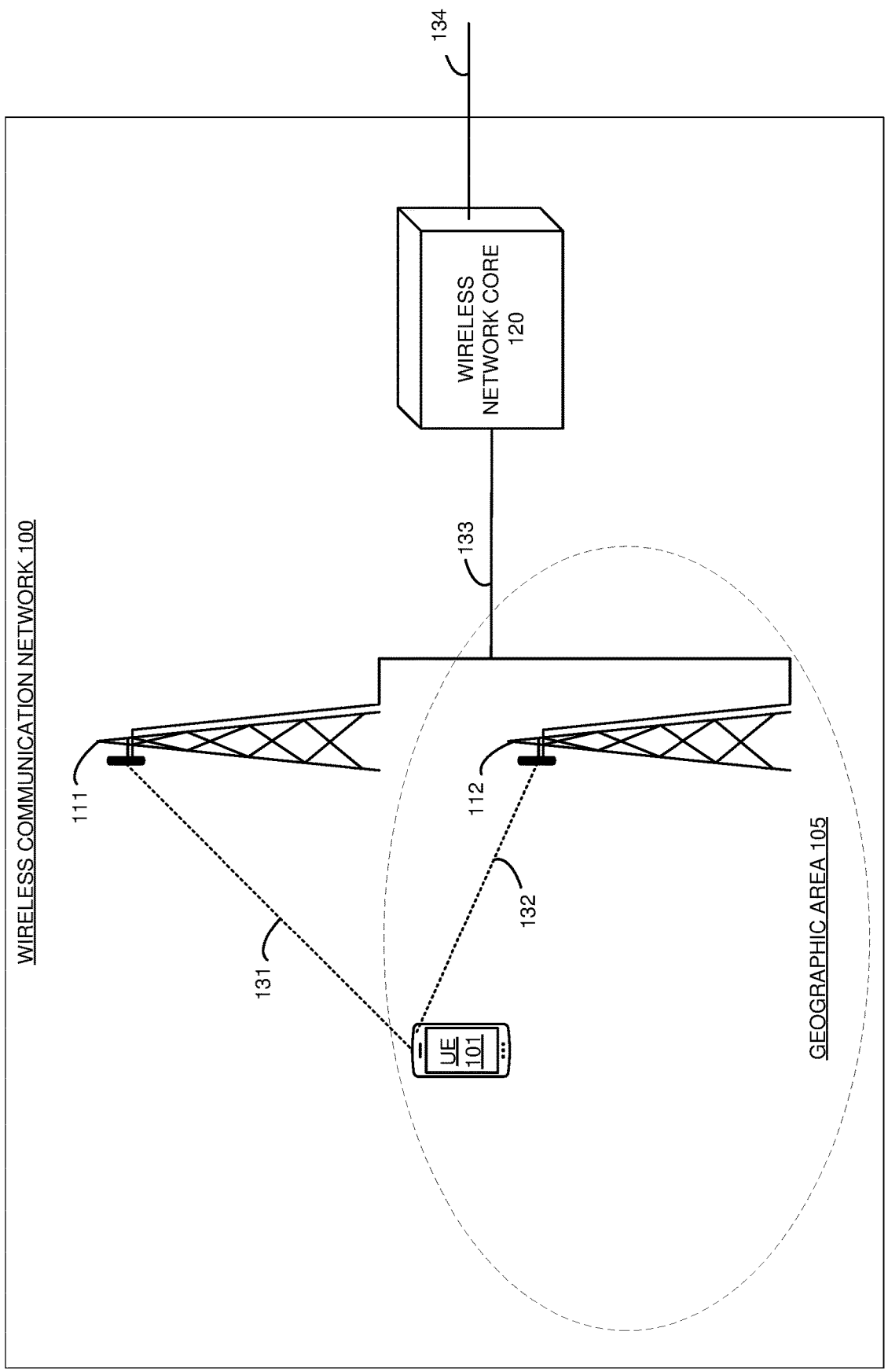
FIG. 1 illustrates a wireless communication network to serve a wireless User Equipment (UE) based on geographic Data Network Names (DNNs).

FIG. 1 illustrates wireless communication network 100 to serve wireless User Equipment (UE) 101 based on geographic Data Network Names (DNNs). Wireless communication network 100 delivers wireless data services to UE 101 like internet-access, video-calling, media-streaming, augmented-reality, machine-control, and/or some other wireless networking data product. Wireless communication network 100 comprises wireless UE 101, wireless access nodes 111-112, and wireless network core 120. Wireless access node 112 is physically located in geographic area #105. Geographic area #105 comprises a network tracking area, geo-fence, network sector, or some other bounded geographic region. The number of UEs, geographic areas, wireless access nodes, and wireless network cores that are depicted on FIG. 1 has been restricted for clarity, and wireless communication network 100 may comprise many more UEs, geographic areas, wireless access nodes, and wireless network cores.

Various examples of network operation and configuration are described herein. In some examples, wireless network core 120 selects DNNs for UE 101. At some point, UE 101 enters idle mode when attached to wireless access node 111. UE 101 physically enters geographic area #105 and hands-over from wireless access node 111 to wireless access node 112. UE 101 detects when it physically enters geographic area #105. For example, wireless access node 112 may broadcast data indicating geographic area #105. Wireless access node 112 wirelessly receives an update from UE 101 that indicates that UE 101 has physically entered geographic area #105. The update may comprise a tracking area update. Wireless access node 112 transfers the update to wireless network core 120. Wireless network core 120 detects that UE 101 has physically entered geographic area #105 and determines that UE 101 is using specific DNNs. Wireless network core 120 may determine other factors like idle status and Service/Session Continuity (SSC) mode.

Wireless network core 120 determines if any DNNs for UE 101 should be reattached in response to UE 101 physically entering geographic area #105. Wireless network core 120 may consider additional factors UE like idle status and SSC mode. If any DNN should be reattached, wireless network core 120 generates a reattach instruction for UE 101 and that DNN. Wireless network core 120 transfers the reattach instruction for UE 101 and the DNN to wireless access node 112. Wireless access node 112 wirelessly transfers the reattach instruction for the DNN to UE 101. In response, wireless access node 112 wirelessly receives a reattachment request from UE 101 for the DNN and transfers the reattachment request to wireless network core 120. Wireless network core 120 receives the reattachment request for the DNN, and in response, selects a Session Management Function (SMF) for UE 101 and the DNN. The selected SMF selects a User Plane Function (UPF) for UE 101 and the DNN. The selected SMF controls the selected UPF for the DNN. When UE 101 returns to active mode, wireless access node 112 wirelessly exchanges user data for the DNN with UE 101. Wireless access node 112 exchanges the user data for the DNN with the selected UPF. The selected UPF exchanges the user data for the DNN with the wireless access node 112 and exchanges the user data for the DNN with other data systems.

Advantageously, wireless network core 120 efficiently and effectively selects new SMFs which select new UPFs (mobility anchors) in response to UE handovers. Moreover, wireless network core 120 optimizes SMFs and UPFs for their UEs and tracking areas through geographically-based DNN reattachment. Other DNNs could be reattached in a like manner. In some examples, wireless network core 120 factors in additional data to reattach DNNs when UE 101 enters geographic area #105. For example, wireless network core 120 may reattach DNNs when UE 101 enters geographic area #105 only if UE 101 is also in idle mode, non-active mode, non-emergency mode, and/or SSC modes 1-2. In some examples, wireless network core 120 may reattach DNNs when UE 101 enters geographic area #105 only if wireless network core 120 has inserted an Intermediate Session Management Function (iSMF) and/or an Intermediate User Plane Function (iUPF) for UE 101.

Wireless UE 101 and wireless access nodes 111-112 wirelessly communicate over wireless links 131-132 using Radio Access Technologies (RATs) like Fifth Generation New Radio (5GNR), Millimeter Wave (MMW), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum.

Wireless access nodes 111-112 communicate with wireless network core 120 over backhaul links 133. Wireless network core 120 communicates with external systems over external links 134. Links 133-134 use metal, glass, air, or some other media. Links 133-134 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UE 101 is depicted as a smartphone, UE 101 might instead comprise a computer, robot, vehicle, or some other data appliance with wireless communication circuitry. Wireless access nodes 111-112 are depicted as towers, but access nodes 111-112 may use other mounting structures or no mounting structure at all. Wireless access nodes 111-112 may comprise gNodeBs, eNodeBs, MMW hot-spots, LP-WAN base stations, relay-UEs, and/or some other form of wireless network transceivers.

Wireless UE 101 and wireless access nodes 111-112 comprise antennas, amplifiers, filters, modulation, and analog/digital interfaces. UE 101, access nodes 111-112, and wireless network core 120 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. Wireless network core 120 comprises network elements like Access and Mobility Management Function (AMF), Authentication and Security Function (AUSF), Network Function Repository (NRF), Unified Data Management (UDM), Network Slice Selection Function (NSSF), Policy Control Function (PCF), Session Management Function (SMF), User Plane Function (UPF), and/or some other network apparatus. In some examples, the network elements in wireless network core 120 comprise Virtual Network Functions (VNFs) in one or more Network Function Virtualization Infrastructures (NFVIs).

Figure 2:
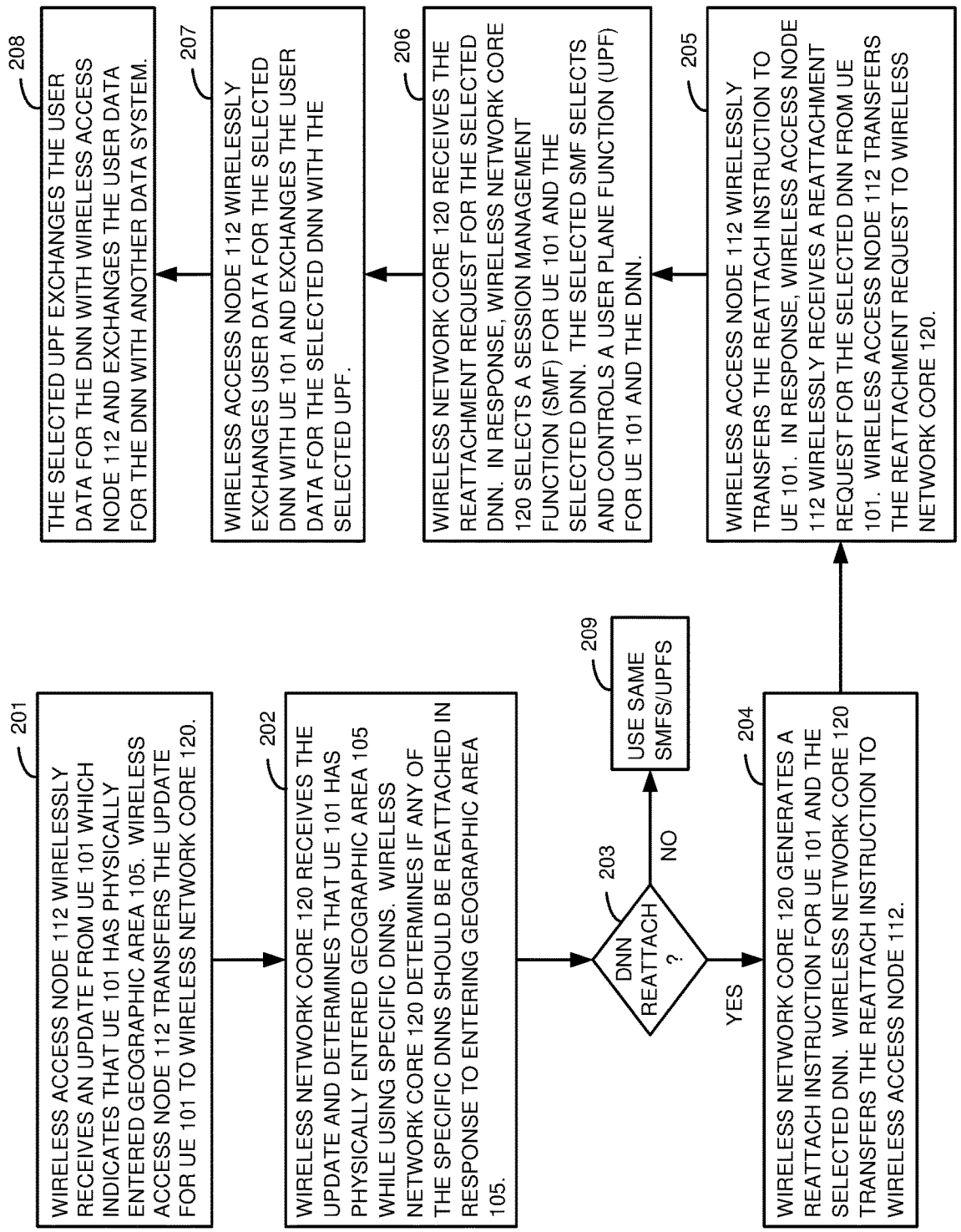
FIG. 2 illustrates an exemplary operation of the wireless communication network to serve the wireless UE based on the geographic DNNs.

FIG. 2 illustrates an exemplary operation of wireless communication network 100 to serve wireless UE 101 based on the geographic DNNs. The operation may differ in other examples. Wireless access node 112 wirelessly receive an update from UE 101 which indicates that UE 101 has physically entered geographic area #105. Wireless access node 112 transfers the update for UE 101 to wireless network core 120 (201). Wireless network core 120 receives the update and determines if UE 101 has physically entered geographic area #105 while using individual DNNs (202). Wireless network core 120 determines if any of the individual DNNs should be reattached in response to entering geographic area #105 (202). If any individual DNN should be reattached (203), wireless network core 120 generates a reattach instruction for UE 101 and the selected DNN (204). Wireless network core 120 transfers the reattach instruction to wireless access node 112 (204). Wireless access node 112 receives the reattach instruction and wirelessly transfers the reattach instruction to UE 101 (205). In response, wireless access node 112 wirelessly receives a reattachment request for the selected DNN from UE 101 (205). Wireless access node 112 transfers the reattachment request to wireless network core 120 (205). Wireless network core 120 receives the reattachment request for the selected DNN (206). In response, wireless network core 120 selects a Session Management Function (SMF) for UE 101 and the selected DNN (206). The selected SMF selects and controls a User Plane Function (UPF) for UE 101 and the DNN (206). Wireless access node 112 wirelessly exchanges user data for the selected DNN with UE 101 and exchanges the user data for the selected DNN with the selected UPF (207). The selected UPF exchanges the user data for the DNN with the wireless access node 112 and exchanges the user data for the DNN with another data system (208). If no DNN should be reattached (203), wireless network core 120 uses the same SMFs and UPFs for UE 101 as before (209).

Figure 3:
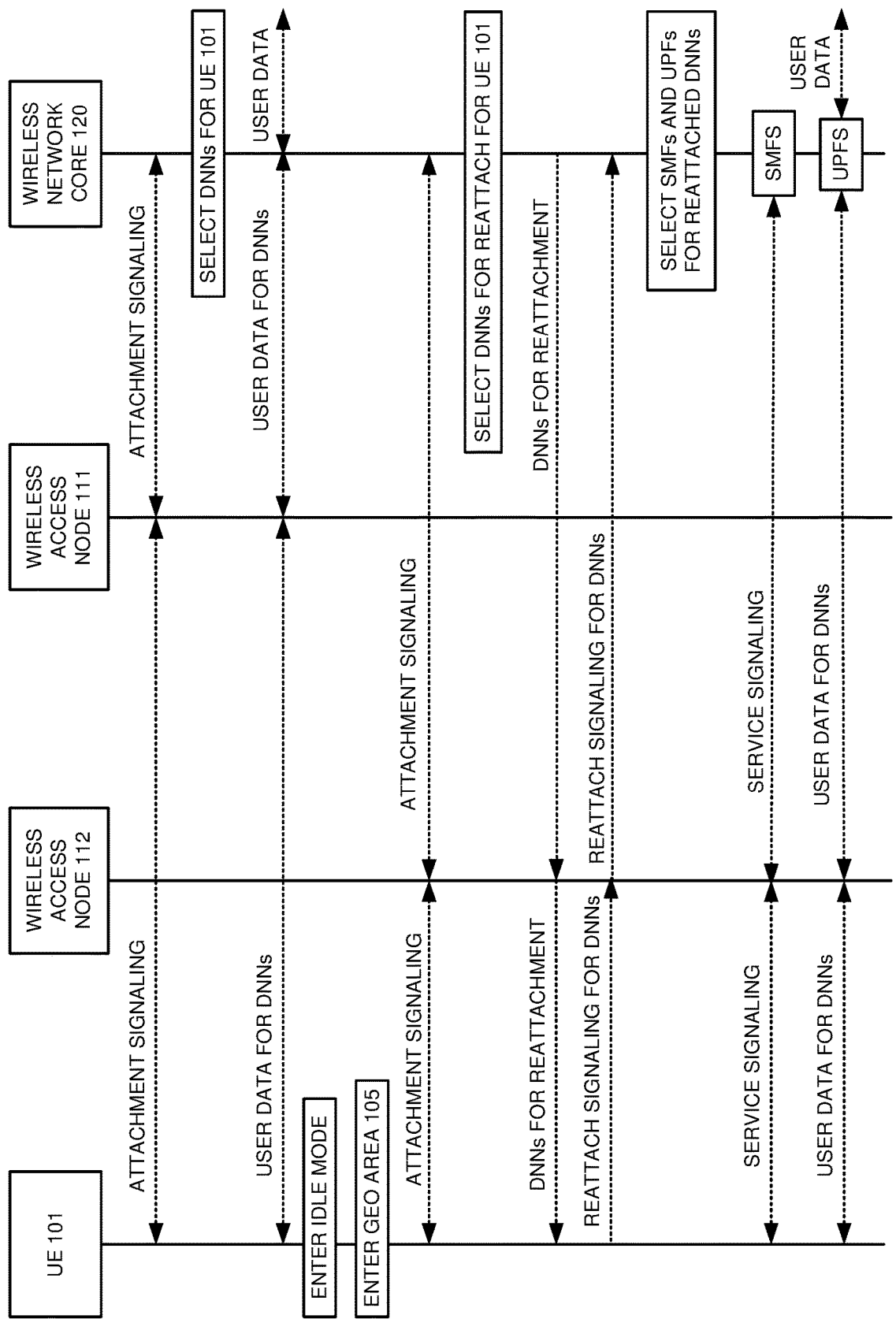
FIG. 3 illustrates an exemplary operation of the wireless communication network to serve the wireless UE based on the geographic DNNs.

FIG. 3 illustrates an exemplary operation of wireless communication network 100 to serve wireless UE 101 based on the geographic DNNs. The operation may differ in other examples. UE 101 and wireless access node 111 wirelessly exchange attachment signaling. Wireless access node 111 and wireless network core 120 exchange the attachment signaling for UE 101. Wireless network core 120 selects DNNs for UE 101 based on data like UE ID. UE 101 and wireless access node 111 wirelessly exchange user data for the selected DNNs. Wireless access node 111 and wireless network core 120 exchange the user data for the selected DNNs. Wireless network core 120 exchanges the user data for the selected DNNs with other data systems.

UE 101 enters idle mode. UE 101 then enters geographic area #105. UE 101 and wireless access node 112 wirelessly exchange attachment signaling. Wireless access node 112 and wireless network core 120 exchange the attachment signaling for UE 101. Wireless network core 120 selects DNNs for reattachment for UE 101 based on the UE's entry into geographic area #105 while in idle mode. Other conditions for DNN reattachment like SSC mode and iSMF insertion could be used. Wireless network core 120 indicates the DNNs for reattachment to wireless access node 112. Wireless access node 112 indicates the DNNs for reattachment to UE 101.

In response, UE 101 transfers reattach signaling for the selected DNNs to wireless access node 112. Wireless access node 112 transfers the reattach signaling for the selected DNNs to wireless network core 120. In response, wireless network core 120 selects SMFs, and the SMFs select UPFs for UE 101 and the selected DNNs. When UE 101 leaves idle mode, UE 101 and wireless access node 112 wirelessly exchange service signaling for the reattached DNNs. Wireless access node 112 exchanges the service signaling for UE 101 and the reattached DNNs with the selected SMFs (over the AMFs) which control the selected UPFs. UE 101 and wireless access node 112 wirelessly exchange user data for the reattached DNNs. Wireless access node 112 exchanges the user data for UE 101 and the reattached DNNs with the selected UPFs. The selected UPFs exchange the user data for UE 101 and the reattached DNNs with other data systems.

Figure 4:
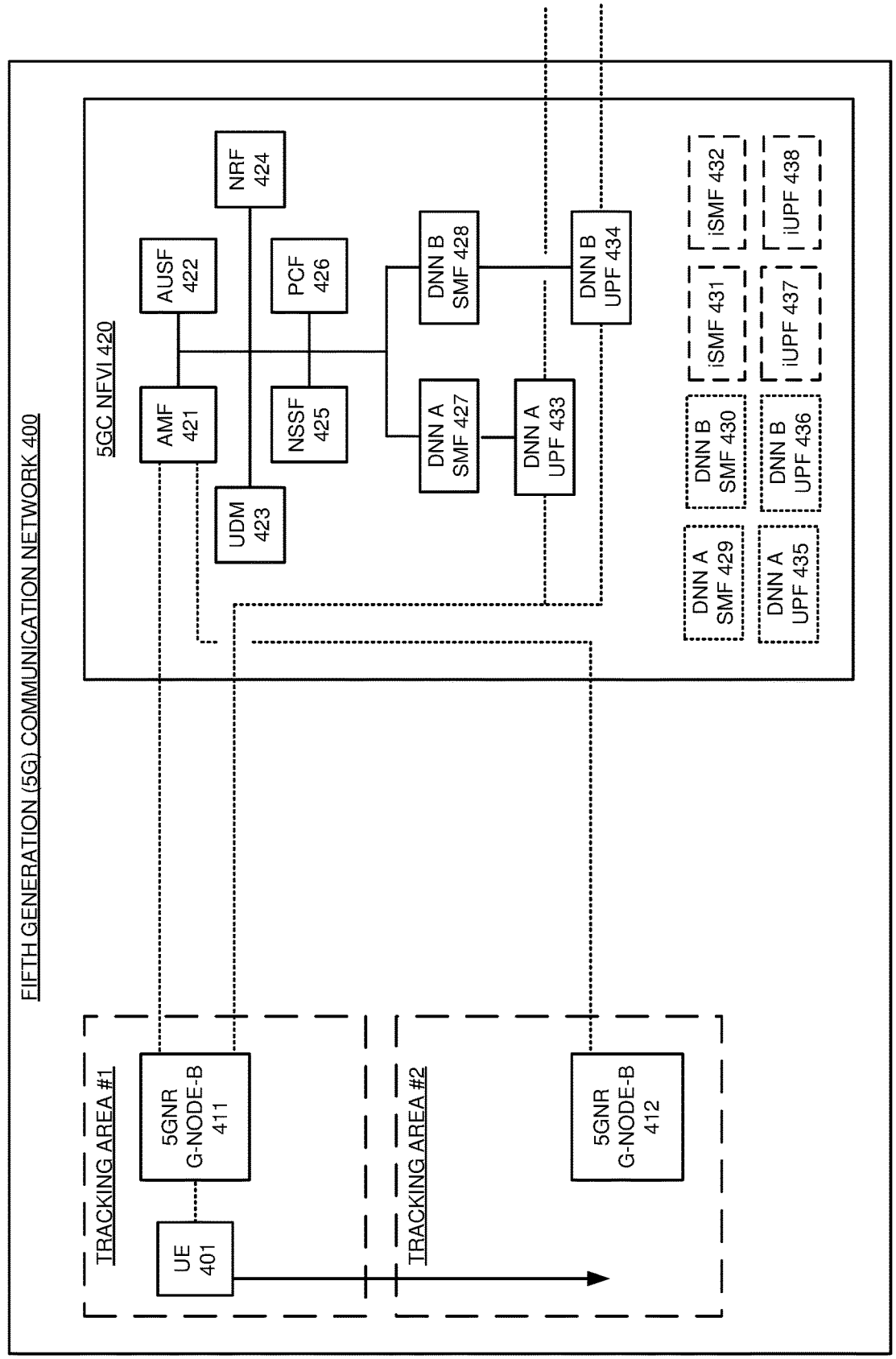
FIG. 4 illustrates a Fifth Generation (5G) communication network to serve a wireless UE based on DNNs and tracking areas.

FIG. 4 illustrates Fifth Generation (5G) communication network 400 to serve wireless UE 401 based on DNNs and tracking areas. 5G communication network 400 comprises an example of wireless communication network 100, although network 100 may differ. 5G communication network 400 delivers wireless data services to UE 401 like internet-access, video-calling, media-streaming, augmented-reality, machine-control, and/or some other wireless networking product. 5G communication network 400 comprises UE 401, 5GNR gNodeBs 411-412, and Fifth Generation Core Network Function Virtualization Infrastructure (5GC NFVI) 420. NFVI 420 comprises Access and Mobility Management Function (AMF) 421, Authentication and Security Function (AUSF) 422, Unified Data Management (UDM) 423, Network Repository Function 424, Network Slice Selection Function (NSSF) 425, Policy Control Function (PCF) 426, Session Management Functions (SMFs) 427-432, and User Plane Functions (UPFs) 433-438.

In this example, UE 401 uses SCC mode 1, although UE 101 could use other SCC modes in other examples. In SCC mode 1, UE 101 retains the same mobility anchor through a handover (except when replaced through DNN reattachment). The UE retains its same network address (except when replaced through DNN reattachment). The UE connection is effectively not broken during the handover (except during DNN reattachment). In SCC mode 2, the UE gets a new mobility anchor and a new network address. The old UE connection is broken before the new UE connection is made. In SCC mode 3, the UE gets a new mobility anchor and a new network address. The new UE connection is made before the old UE connection is broken. In this example, DNN reattachment is used for SCC modes 1-2 but DNN reattachment is not used for SSC mode 3.

Initially, UE 401 attaches to 5GNR gNodeB 411. 5GNR gNodeB 411 selects AMF 421 for UE 401 based on the UE's location in tracking area #1. 5GNR gNodeB 411 transfers initial UE signaling for UE 401 to selected AMF 421. To authenticate UE 401, AMF 421 interacts with AUSF 422 which interacts with UDM 423 to challenge and verify the identity of UE 401. AMF 421 interacts with UDM 423 to obtain subscription data for UE 401 like DNNs and Session/Service Continuity (SSC) mode. In this example, UE 401 uses SCC mode 1 and representative DNNs "A" and "B". AMF 421 interacts with NSSF 423 to obtain slice data for the DNNs for UE 401 like prioritized and authorized slice IDs per DNN. AMF 421 interacts with NRF 424 to select PCF 423 based on the DNNs and their slice IDs. AMF 421 interacts with PCF 423 to obtain policy data for UE 401 and the DNNs like Quality-of-Service Flow Indicators (QFIs). AMF 421 interacts with NRF 424 to select SMF 427 for DNN A based on DNN A and the location of UE 401 in tracking area #1. AMF 421 interacts with NRF 424 to select SMF 428 for DNN B based on DNN B and the location of UE 401 in tracking area #1. SMF 427 interacts with NRF 424 to select UPF 433 for DNN A based on DNN A and the location of UE 401 in tracking area #1. SMF 428 interacts with NRF 424 to select UPF 434 for DNN B based on DNN B and the location of UE 401 in tracking area #1.

SMF 427 allocates a network address for DNN A to UE 401. SMF 427 directs UPF 433 to serve UE 401 over 5GNR gNodeB 411 for DNN A per its slice ID, QFI, network address, and the like. SMF 428 allocates a network address for DNN B to UE 401. SMF 428 directs UPF 434 to serve UE 401 over 5GNR gNodeB 411 for DNN B per its slice ID, QFI, network address, and the like. AMF 421 directs 5GNR gNodeB 411 to serve UE 401 using the DNNs, slice IDs, QFIs, network addresses, and the like. 5GNR gNodeB 411 signals UE 401 to use the DNNs, slice IDs, QFIs, network addresses, and the like.

UE 401 and 5GNR gNodeB 411 exchange user data for DNN A. 5GNR gNodeB 411 and UPF 433 exchange the user data for DNN A. UPF 433 exchanges the user data for DNN A with external systems. UE 401 and 5GNR gNodeB 411 exchange user data for DNN B. 5GNR gNodeB 411 and UPF 434 exchange the user data for DNN B. UPF 434 exchanges the user data for DNN A with external systems. UE 401 moves about and communicates with other wireless access nodes that are omitted from FIG. 4 for clarity. Eventually, UE 401 is coupled to 5GNR gNodeB 411 in tracking area #1, and UE 401 enters idle mode (which includes non-active and non-emergency modes) on DNNs A and B.

UE 401 physically moves from tracking area #1 to tracking area #2. In response to the move and corresponding loss of signal strength, 5GNR gNodeB 411 hands UE 401 over to 5GNR gNodeB 412. 5GNR gNodeB 411 broadcasts a signal that indicates tracking area #1, and 5GNR gNodeB 412 broadcasts a signal that indicates tracking area #2. UE 401 receives and processes these signals to detect its physical move from tracking area #1 to tracking area #2. In response to the change in tracking areas, UE 401 transfers a tracking area update to AMF 421 over gNodeB 412 that indicates new tracking area #2 for UE 401.

5GNR gNodeB 412 is unable to readily communicate with UPFs 433-434 due to the use of different physical and/or virtual platforms or some other factor. Thus, 5GNR gNodeB 412 and UPFs 433-434 do not have the same ability to set-up user data tunnels like 5GNR gNodeB 411 and UPFs 433-434. To counter this problem, AMF 421 inserts intermediate UPF (iUPF) 437 between 5GNR gNodeB 412 and UPF 433. AMF 421 inserts iUPF 438 between 5GNR gNodeB 412 and UPF 434. AMF 421 inserts intermediate SMF (iSMF) 431 to drive iUPF 437 for SMF 427. AMF 421 inserts iSMF 432 to drive iUPF 438 for SMF 428. This new 5G network configuration is shown in FIG. 5.

Figure 5:
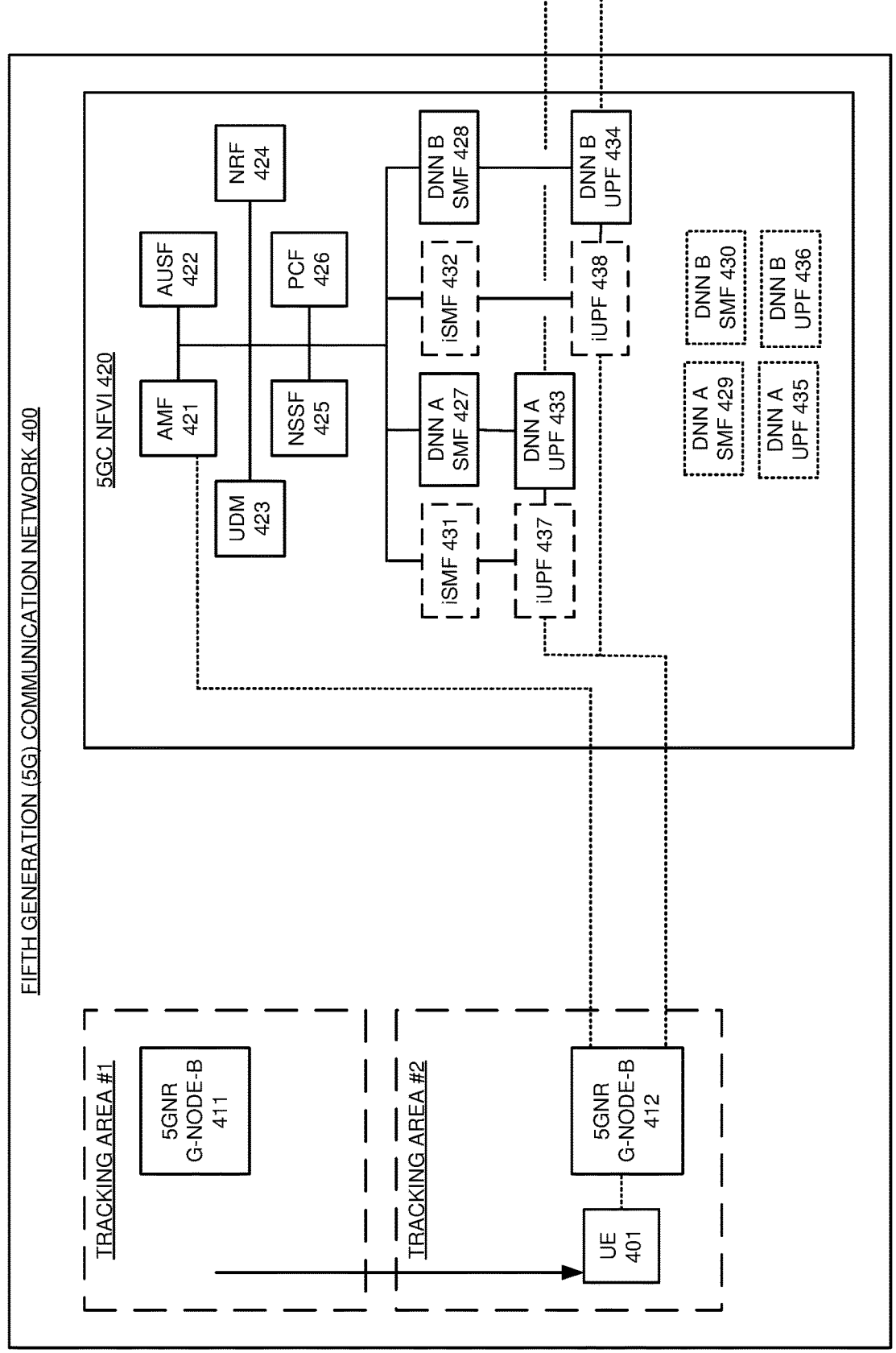
FIG. 5 illustrates the 5G communication network to serve the wireless UE based on the DNNs and the tracking areas.

FIG. 5 illustrates 5G communication network 400 to serve wireless UE 401 based on the DNNs and the tracking areas. Due to the handover of UE 401 from 5GNR gNodeB 411 to 5GNR gNodeB 412, AMF 421 has inserted iSMF 431 to drive iUPF 437 for SMF 427, and AMF 421 has inserted iSMF 432 to drive iUPF 438 for SMF 428. AMF 421 may use NRF 424 to select iSMFs/iUPFs based on DNNs and tracking areas. If UE 401 were to enter active mode on DNN A, UE 401 and 5GNR gNodeB 412 would exchange user data for DNN A, 5GNR gNodeB 412 and iUPF 437 would exchange the user data for DNN A, and iUPF 437 and UPF 433 would exchange the user data for DNN A. If UE 401 were to enter active mode on DNN B, UE 401 and 5GNR gNodeB 412 would exchange user data for DNN B, 5GNR gNodeB 412 and iUPF 438 would exchange the user data for DNN B, and iUPF 438 and UPF 434 would exchange the user data for DNN B.

In this example, UE 401 remains in idle mode in tracking area #2 on DNNs A and B. AMF 421 notifies PCF 423 over the N15 interface that iSMF 431 has been inserted for DNN A for UE 401 which is idle and uses SCC 1. AMF 421 also notifies PCF 423 that iSMF 432 has been inserted for DNN B for UE 401 which is idle and uses SCC 1. In response to the notifications, PCF 426 transfers reattach signaling to UE 401 for DNNs A and B over SMFs 427-428, AMF 421, and gNodeB 412. UE 401 receives the reattach signaling and transfers the reattach requests for DNNs A and B to 5GNR gNodeB 412. 5GNR gNodeB 412 transfers the reattach requests for DNNs A and B for UE 401 to AMF 421. In response, AMF 421 interacts with NRF 424 to select SMF 429 for UE 401 and DNN A based on DNN A, the location of UE 401 in tracking area #2, idle mode (including non-active and non-emergency modes), SCC 1, and possibly other factors. AMF 421 interacts with NRF 424 to select SMF 430 for UE 401 and DNN B based on DNN B, the location of UE 401 in tracking area #2, idle mode (including non-active and non-emergency modes), SCC 1, and possibly other factors. SMF 429 interacts with NRF 424 to select UPF 435 for DNN A based on DNN A and the location of UE 401 in tracking area #1. SMF 430 interacts with NRF 424 to select UPF 436 for DNN B based on DNN B and the location of UE 401 in tracking area #2. NFVI 420 replaces iSMF 431 and SMF 427 with SMF 429. NFVI 420 replaces iSMF 432 and SMF 428 with SMF 430. NFVI 420 replaces iUPF 437 and UPF 433 with UPF 435. NFVI 420 replaces iUPF 438 and UPF 434 with UPF 436. This new 5G network configuration is shown in FIG. 6.

Figure 6:
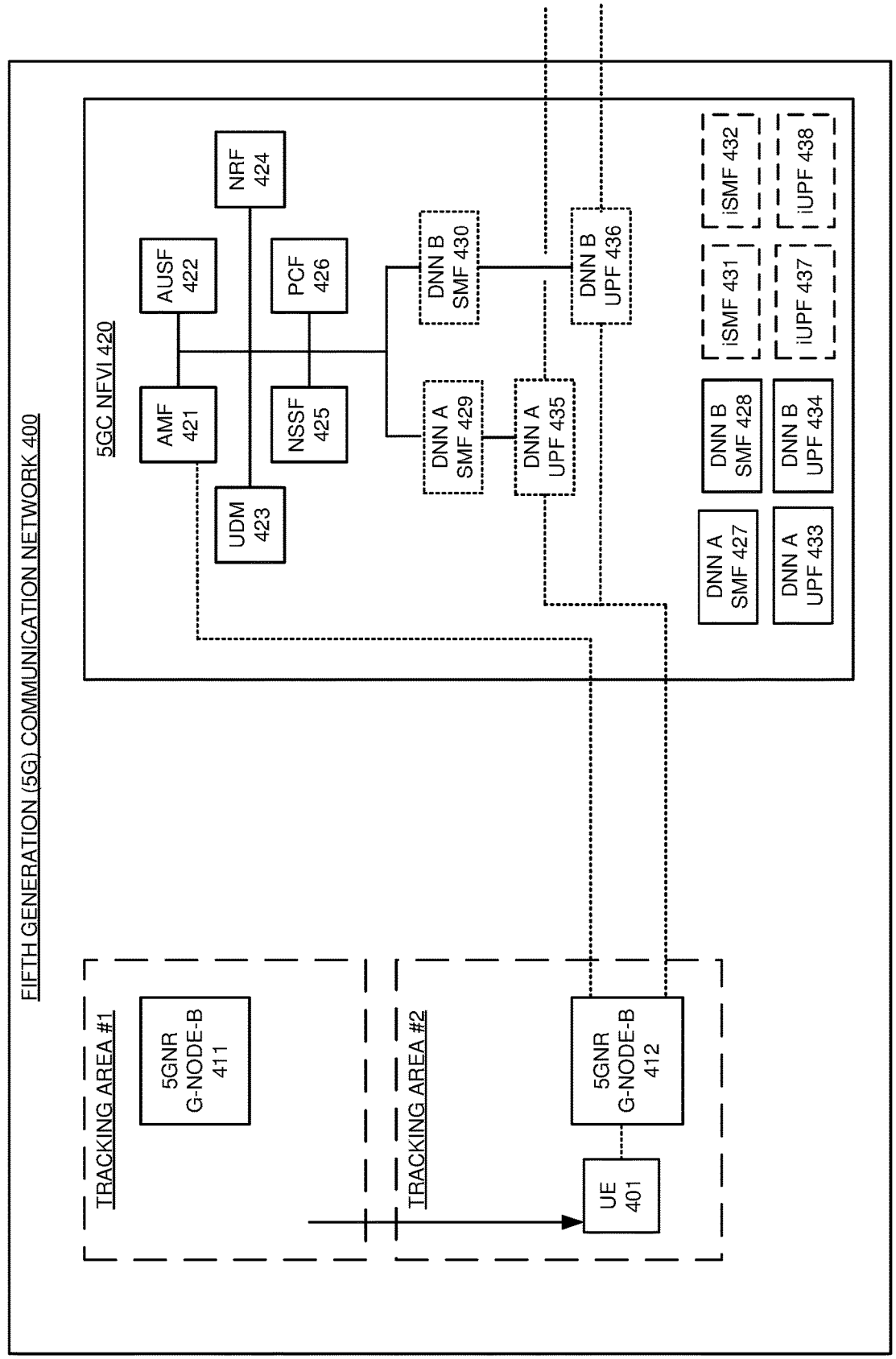
FIG. 6 illustrates the 5G communication network to serve the wireless UE based on the DNNs and the tracking areas.

FIG. 6 illustrates 5G communication network 400 to serve wireless UE 401 based on the DNNs and the tracking areas. NFVI 420 has replaced iSMF 431 and SMF 427 with SMF 429. NFVI 420 has replaced iSMF 432 and SMF 428 with SMF 430. NFVI 420 has replaced iUPF 437 and UPF 433 with UPF 435. NFVI 420 has replaced iUPF 438 and UPF 434 with UPF 436. AMF 421 interacts with NSSF 423 to obtain slice data for DNNs A and B for UE 401 like prioritized and authorized slice IDs per DNN. AMF 421 interacts with NRF 424 to select PCF 426 based on DNN A and B and their slice IDs. AMF 421 interacts with PCF 426 to obtain policy data for UE 401 like QFIs. SMF 429 allocates a network address for DNN A to UE 401. SMF 429 directs UPF 435 to serve UE 401 over 5GNR gNodeB 412 for DNN A per its slice ID, QFI, network address, and the like. SMF 430 allocates a network address for DNN B to UE 401. SMF 430 directs UPF 436 to serve UE 401 over 5GNR gNodeB 412 for DNN B per its slice ID, QFI, network address, and the like. AMF 421 directs 5GNR gNodeB 412 to serve UE 401 using the DNNs, slice IDs, QFIs, network addresses, and the like. 5GNR gNodeB 412 signals UE 401 to use the DNNs, slice IDs, QFIs, network addresses, and the like.

UE 401 enters active mode on DNNs A and B. UE 401 and 5GNR gNodeB 412 exchange user data for DNN A. 5GNR gNodeB 412 and UPF 435 exchange the user data for DNN A. SMF 429 controls UPF 435 for DNN A. UPF 435 exchanges the user data for DNN A with external systems. UE 401 and 5GNR gNodeB 412 exchange user data for DNN B. 5GNR gNodeB 412 and UPF 436 exchange the user data for DNN B. SMF 430 controls UPF 436 for DNN B. UPF 436 exchanges the user data for DNN B with external systems.

Figure 7:
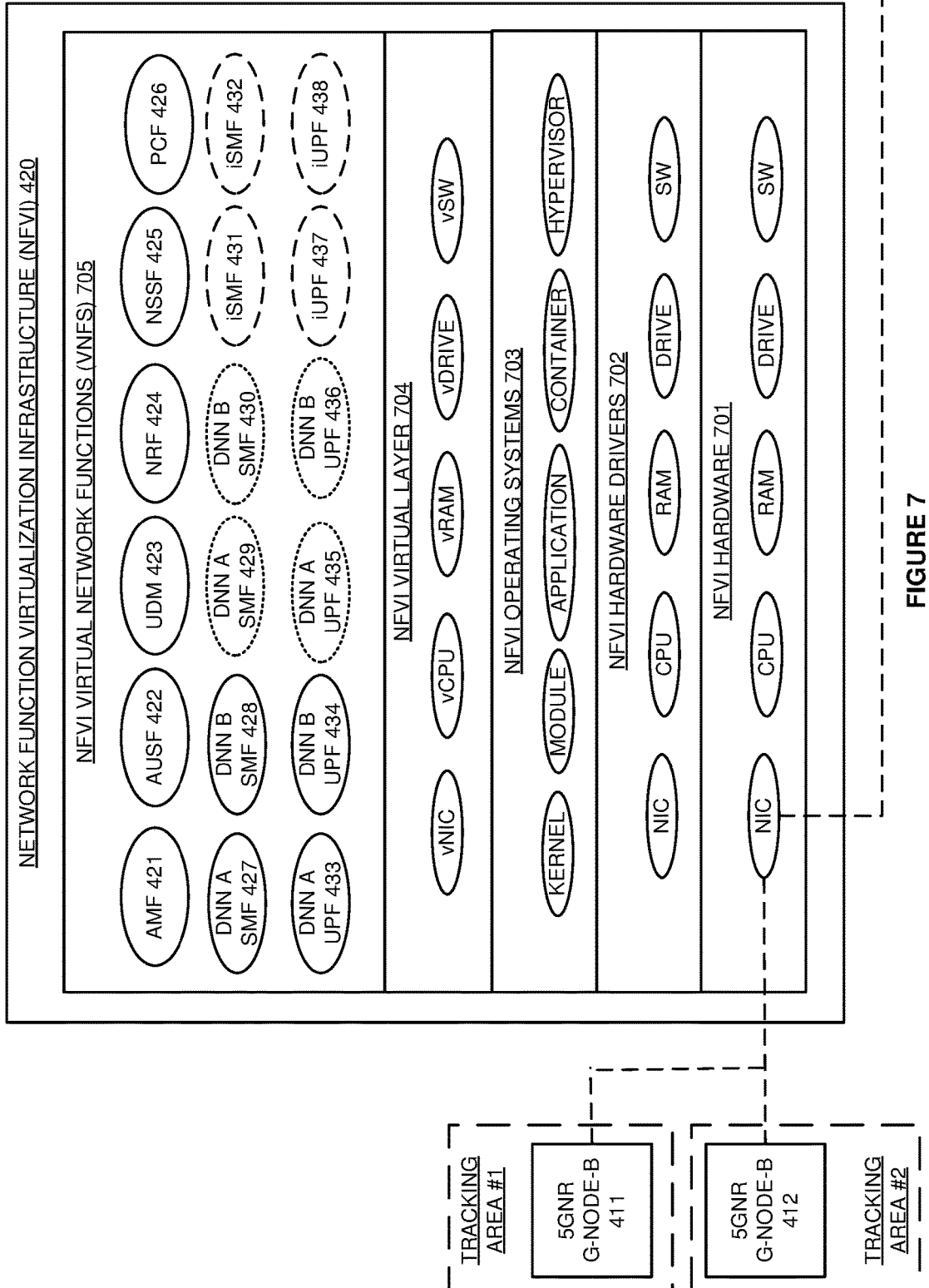
FIG. 7 illustrates a 5GC Network Function Virtualization Infrastructure (NFVI) to serve the wireless UE based on the DNNs and the tracking areas.

FIG. 7 illustrates 5GC Network Function Virtualization Infrastructure (NFVI) 420 to serve wireless UE 401 based on the DNNs and the tracking areas. NFVI 420 comprises an example of wireless network core 120, although network core 120 may differ. NFVI 420 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise Access and Mobility Management Functions (AMF) 421, Authentication and Security Functions (AUSF) 422, Unified Data Managers (UDM) 423, Network Repository Functions (NRF) 424, Network Slice Selection Functions (NSSF) 425, Policy Control Functions (PCF) 426, Session Management Functions (SMF) 427-432, and User Plane Functions (UPF) 433-438. Other VNFs are typically present but are omitted for clarity.

NFVI 420 may be located at a single site or be distributed across multiple geographic locations. The NIC are coupled to 5GNR gNodeBs 411-412 and external systems. NFVI hardware 701 executes NFVI hardware drivers 702, NFVI operating systems 703, NFVI virtual layer 704, and NFVI VNFs 705 to serve UE 401 over 5GNR gNodeBs 411-412. NFVI 420 exchanges 5GC signaling and data with 5GNR gNodeBs 411-412 to serve UE 401 with the wireless data services. NFVI 420 exchanges some of the data with external systems.

Figure 8:
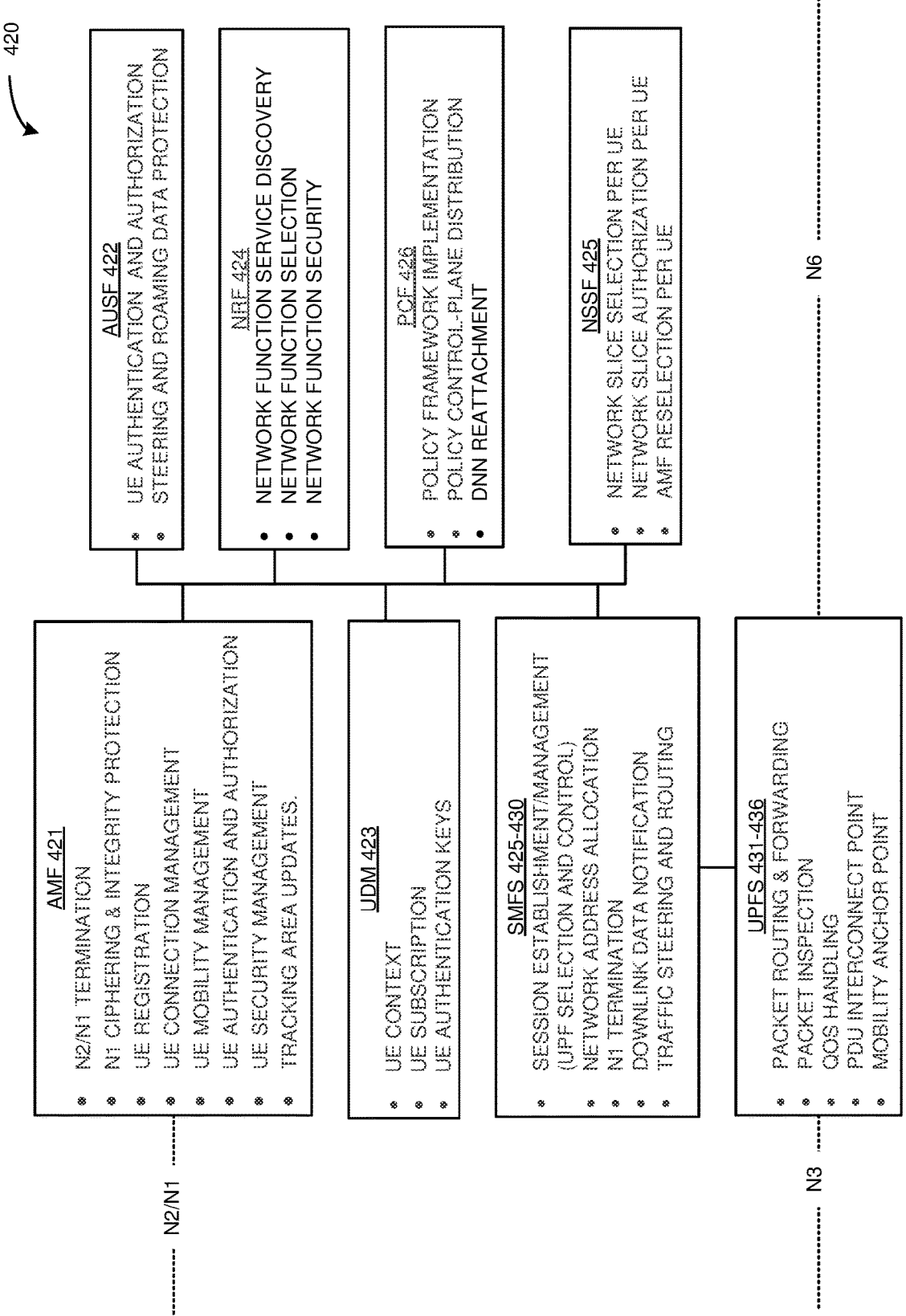
FIG. 8 illustrates the 5GC NFVI to serve the wireless UE based on the DNNs and the tracking areas.

FIG. 8 illustrates 5GC NFVI 420 to serve wireless UE 401 based on the DNNs and the tracking areas. AMF 421 performs N2/N1 termination, N1 ciphering & integrity protection, UE registration, SMF/PCF selection, UE connection/mobility management, UE authentication and authorization, UE security management, and tracking area updates (including DNN reattachment). AUSF 422 performs UE authentication with Authentication and Key Agreement (AKA) credentials and handles UE authorizations. UDM 423 handles UE context, UE subscription data, and UE authentication keys. NRF 424 performs network function authentication and authorization, network function selection, and network function security. NSSF 425 performs network slice selection per UE, network slice authorization per UE, and AMF selection per UE. PCF 426 performs policy framework implementation, policy control-plane distribution, and supports DNN reattachment in response to tracking area updates from AMF 421. SMFs 427-432 perform session establishment/management which includes UPF selection and control), network address allocation, N1 termination, downlink data notification, and traffic steering and routing. UPFs 433-438 perform packet routing & forwarding, packet inspection, QoS handling, PDU interconnection, and mobility anchoring.

Referring back to FIG. 7, AMF 421 exchanges N2/N1 signaling with 5GNR gNodeBs 411-412 over backhaul links. AMF 421 exchanges some of the N1 signaling with SMFs 427-432. UPFs 433-438 exchange N3 data with 5GNR gNodeBs 411-412 over the backhaul links. UPFs 433-438 also exchanges corresponding N6 data with external systems.

AMF 421 interacts with AUSF 422 which interacts with UDM 423 to challenge and verify the identity of UE 401. AMF 421 interacts with UDM 423 to obtain subscription data for UE 401 like DNNs and SSC modes. AMF 421 interacts with NSSF 425 to obtain slice data for the DNNs for UE 401 like prioritized and authorized slice IDs per DNN. AMF 421 interacts with NRF 424 to select PCF 423 based on the DNNs and their slice IDs. AMF 421 interacts with PCF 423 to obtain policy data for UE 401 and the DNNs like Quality-of-Service Flow Indicators (QFIs). AMF 421 interacts with NRF 424 to select SMF 427 for DNN A based on DNN A and the location of UE 401 in tracking area #1. AMF 421 interacts with NRF 424 to select SMF 428 for DNN B based on DNN B and the location of UE 401 in tracking area #1. SMF 427 interacts with NRF 424 to select UPF 433 for DNN A based on DNN A and the location of UE 401 in tracking area #1. SMF 428 interacts with NRF 424 to select UPF 434 for DNN B based on DNN B and the location of UE 401 in tracking area #1.

SMF 427 allocates a network address for DNN A to UE 401. SMF 427 directs UPF 433 to serve UE 401 over 5GNR gNodeB 411 for DNN A per its slice ID, QFI, network address, and the like. SMF 428 allocates a network address for DNN B to UE 401. SMF 428 directs UPF 434 to serve UE 401 over 5GNR gNodeB 411 for DNN B per its slice ID, QFI, network address, and the like. AMF 421 directs 5GNR gNodeB 411 to serve UE 401 using the DNNs, slice IDs, QFIs, network addresses, and the like. 5GNR gNodeB 411 and UPF 433 exchange the user data for DNN A. UPF 433 exchanges the user data for DNN A with external systems. 5GNR gNodeB 411 and UPF 434 exchange the user data for DNN B. UPF 434 exchanges the user data for DNN A with external systems. UE 401 physically moves from tracking area #1 to tracking area #2. In response to the move, UE 401 transfers a tracking area update to AMF 421 over gNodeB 412 that indicates new tracking area #2 for UE 401.

AMF 421 inserts iUPF 437 between 5GNR gNodeB 412 and UPF 433. AMF 421 inserts iUPF 438 between 5GNR gNodeB 412 and UPF 434. AMF 421 inserts iSMF 431 to drive iUPF 437 for SMF 427. AMF 421 inserts iSMF 432 to drive iUPF 434 for SMF 428. While UE 401 remains in idle mode in tracking area #2 on DNNs A and B, AMF 421 notifies PCF 423 over the N15 interface that iSMF 431 has been inserted for DNN A for UE 401 which is idle and uses SCC 1. AMF 421 also notifies PCF 423 that iSMF 432 has been inserted for DNN B for UE 401 which is idle and uses SCC 1. In response to the notifications, PCF 426 transfers reattach signaling to UE 401 for DNNs A and B over SMFs 427-428, AMF 421, and gNodeB 411. 5GNR gNodeB 412 transfers the reattach requests for DNNs A and B for UE 401 to AMF 421. In response, AMF 421 interacts with NRF 424 to select SMF 429 for UE 401 and DNN A based on DNN A, the location of UE 401 in tracking area #2, idle mode (including non-active and non-emergency modes), SCC 1, and possibly other factors. AMF 421 interacts with NRF 424 to select SMF 430 for UE 401 and DNN B based on DNN B, the location of UE 401 in tracking area #2, idle mode (including non-active and non-emergency modes), SCC 1, and possibly other factors. SMF 429 interacts with NRF 424 to select UPF 435 for DNN A based on DNN A and the location of UE 401 in tracking area #1. SMF 430 interacts with NRF 424 to select UPF 436 for DNN B based on DNN B and the location of UE 401 in tracking area #2. NFVI 420 replaces iSMF 431 and SMF 427 with SMF 429. NFVI 420 replaces iSMF 432 and SMF 428 with SMF 430. NFVI 420 replaces iUPF 437 and UPF 433 with UPF 435. NFVI 420 replaces iUPF 438 and UPF 434 with UPF 436.

AMF 421 interacts with NSSF 423 to obtain slice data for DNNs A and B for UE 401 like prioritized and authorized slice IDs per DNN. AMF 421 interacts with NRF 424 to select PCF 426 based on DNN A and B and their slice IDs. AMF 421 interacts with PCF 426 to obtain policy data for UE 401 like QFIs. SMF 429 allocates a network address for DNN A to UE 401. SMF 429 directs UPF 435 to serve UE 401 over 5GNR gNodeB 412 for DNN A per its slice ID, QFI, network address, and the like. SMF 430 allocates a network address for DNN B to UE 401. SMF 430 directs UPF 436 to serve UE 401 over 5GNR gNodeB 412 for DNN B per its slice ID, QFI, network address, and the like. AMF 421 directs 5GNR gNodeB 412 to serve UE 401 using the DNNs, slice IDs, QFIs, network addresses, and the like. 5GNR gNodeB 412 and UPF 435 exchange the user data for DNN A. SMF 429 controls UPF 435 for DNN A. UPF 435 exchanges the user data for DNN A with external systems. 5GNR gNodeB 412 and UPF 436 exchange the user data for DNN B. SMF 430 controls UPF 436 for DNN B. UPF 436 exchanges the user data for DNN B with external systems.

Figure 9:
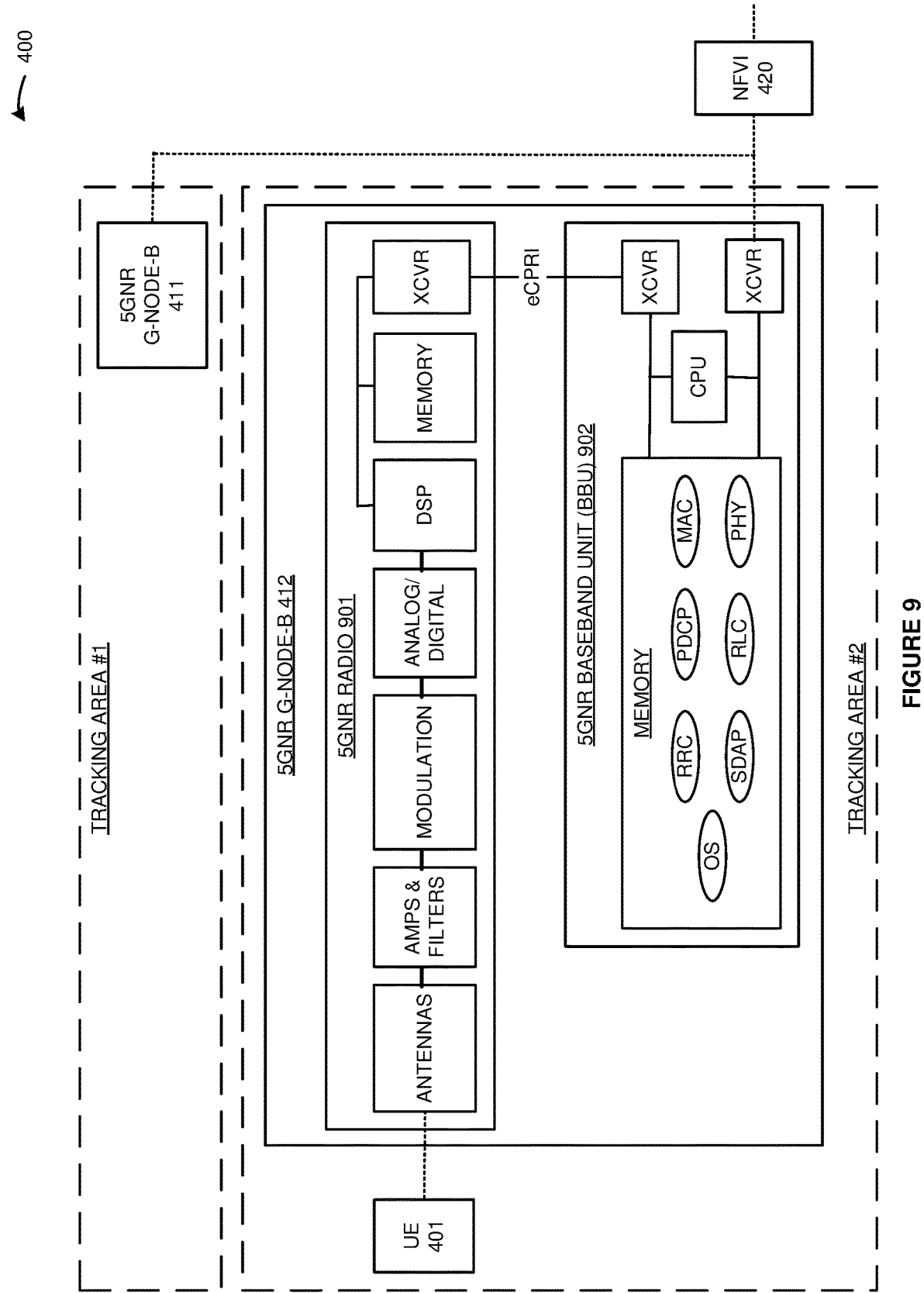
FIG. 9 illustrates a Fifth Generation New Radio (5GNR) gNodeB to serve the wireless UE based on the DNNs and the tracking areas.

FIG. 9 illustrates Fifth Generation New Radio (5GNR) gNodeB 412 to serve wireless UE 401 based on the DNNs and the tracking areas. 5GNR gNodeB 412 comprises an example of wireless access nodes 111-112, although access nodes 111-112 may differ. 5GNR gNodeB 411 would be similar to 5GNR gNodeB 412. 5GNR gNodeB 412 comprises 5GNR radio 901 and 5GNR Baseband Unit (BBU) 902. 5GNR radio 901 comprises antennas, amplifiers, filters, modulation, analog-to-digital interfaces, DSP, memory, and transceivers that are coupled over bus circuitry. 5GNR BBU 902 comprises memory, CPU, and transceivers (XCVRs) that are coupled over bus circuitry. The memory in 5GNR BBU 902 stores an operating system and 5GNR network applications like Physical Layer (PHY), Media Access Control (MAC), Radio Link Control (RLC), Packet Data Convergence Protocol (PDCP), Service Data Adaptation Protocol (SDAP), and Radio Resource Control (RRC). 5GNR BBU 902 may be physically separated into a Distributed Unit (DU) and a Centralized Unit (CU) that each resemble BBU 902. The CU and DU would each host a portion of the software in BBU 902 and would be coupled over fronthaul links.

UE 401 is wirelessly coupled to the antennas in 5GNR radio 901 over 5GNR links. Transceivers in 5GNR 901 are coupled to transceivers in 5GNR BBU 902 over enhanced CPRI (eCPRI) links. Transceivers in 5GNR BBU 902 are coupled to NFVI 420 over backhaul links. The CPU in 5GNR BBU 902 executes the operating system, PHY, MAC, RLC, PDCP, SDAP, and RRC to exchange 5GNR signaling and data with UE 401 and to exchange 5GC/X2 signaling and data with NFVI 420 and other NodeBs. NFVI 420 directs 5GNR BBU 902 to serve UE 401 based on the selected network slices, DNNs, QFIs, network addresses, and the like.

In 5GNR radio 901, the antennas receive wireless 5GNR signals from 5GNR UE 401 that transport uplink 5GNR signaling and data. The antennas transfer corresponding electrical uplink signals through duplexers to the amplifiers. The amplifiers boost the electrical uplink signals for filters which attenuate unwanted energy. Demodulators downconvert the filtered uplink signals from their carrier frequency. The analog/digital interfaces convert the demodulated analog uplink signals into digital uplink signals for the DSPs. The DSPs recover uplink 5GNR symbols from the uplink digital signals. In 5GNR BBU 902, the CPU executes the network applications to process the uplink 5GNR symbols and recover the uplink 5GNR signaling and data. The network applications process the uplink 5GNR signaling, downlink 5GC N2 signaling, and X2 signaling to generate new downlink 5GNR signaling, new uplink 5GC N2 signaling, and new X2 signaling. The RRC transfers the new uplink 5GC N2/N1 signaling to NFVI 420 and the X2 signaling to other NodeBs. The SDAP transfers corresponding 5GC N3 data to NFVI 420 and the other NodeBs.

In 5GNR BBU 902, the RRC receives the 5GC N2/N1 signaling from NFVI 420 and X2 signaling from the other NodeBs. The SDAP receives 5GC N3 data from NFVI 420 and receives X2 data from and the other NodeBs. The 5GNR network applications process the new downlink 5GC signaling and data to generate corresponding downlink 5GNR symbols. In 5GNR radio 901, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and data.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

5GNR BBU 902 in 5GNR gNodeB 412 broadcasts a signal over radio 5GNR 901 that indicates tracking area #2. UE 401 receives and processes the signal to detect its physical move from tracking area #1 to tracking area #2. In response, UE 401 notifies 5GNR BBU 902 over 5GNR radio 901. 5GNR BBU 902 transfers a tracking area update to AMF 421 over gNodeB 412 that indicates the new tracking area #2 for UE 401. 5GNR BBU 902 exchanges reattach signaling and requests between UE 401 and AMF 421 in NFVI 420. AMF 421 directs 5GNR BBU 902 to serve UE 401 using the DNNs, slice IDs, QFIs, network addresses, and the like. 5GNR BBU 902 signals UE 401 over 5GNR radio 901 to use the DNNs, slice IDs, QFIs, network addresses, and the like. UE 401 and 5GNR BBU 902 exchange user data for DNN A over 5GNR radio 901. 5GNR BBU 902 and UPF 435 in NFVI 420 exchange the user data for DNN A. UE 401 and 5GNR BBU 902 gNodeB 412 exchange user data for DNN B over 5GNR radio 901. 5GNR BBU 902 and UPF 436 in NFVI 420 exchange the user data for DNN B.

Figure 10:
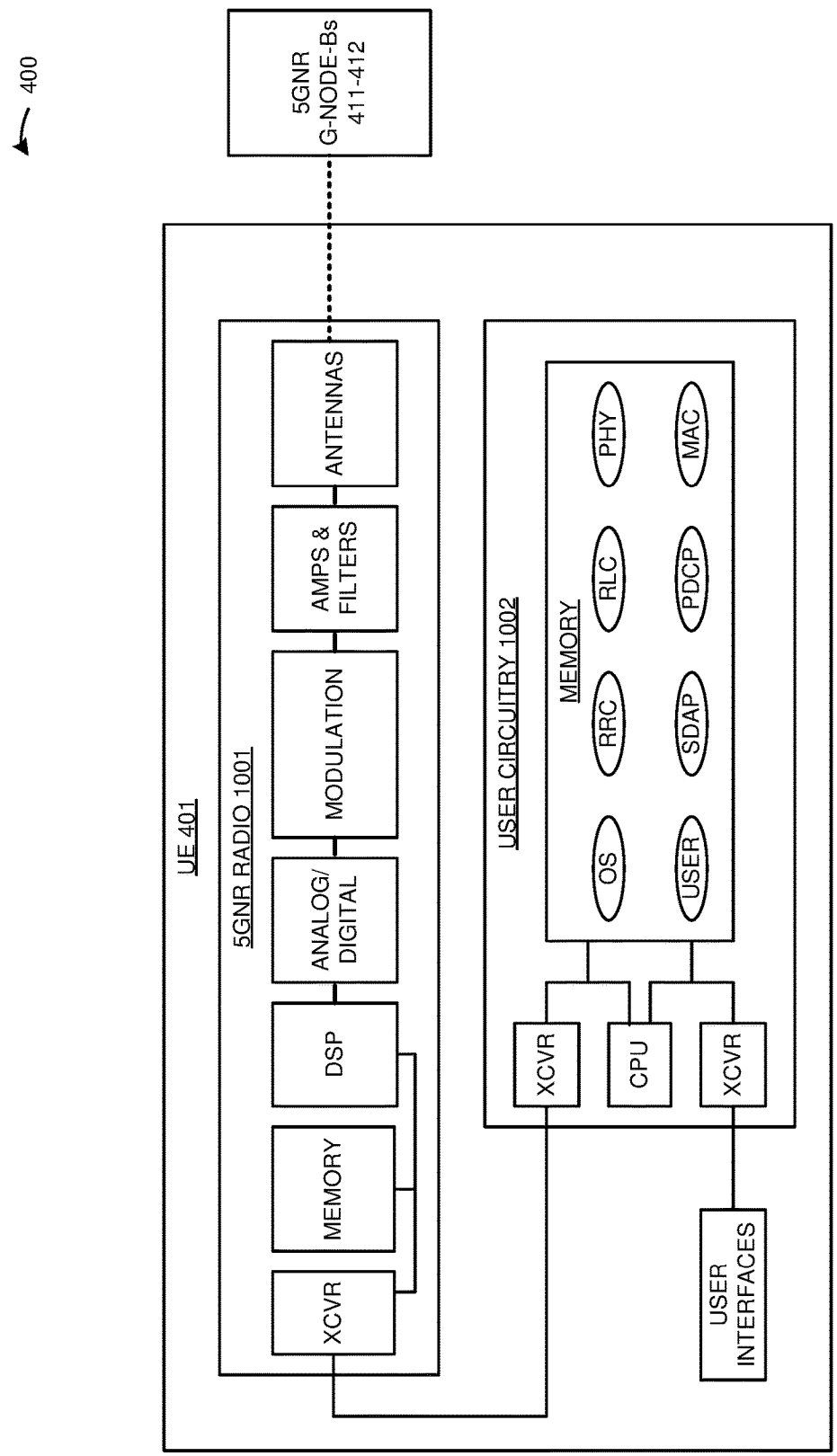
FIG. 10 illustrates the wireless UE that is served based on the DNNs and the tracking areas.

FIG. 10 illustrates wireless UE 401 that is served based on the DNNs and the tracking areas. UE 401 comprises an example of UE 101, although UE 101 may differ. UE 401 comprises 5GNR radio 1001 and user circuitry 1002. 5GNR radio 1001 comprises antennas, amplifiers, filters, modulation, analog-to-digital interfaces, DSP, memory, and transceivers that are coupled over bus circuitry. User circuitry 1002 comprises memory, CPU, user interfaces, and transceivers that are coupled over bus circuitry. The memory in user circuitry 1002 stores an operating system, user applications (USER), and 5GNR network applications for PHY, MAC, RLC, PDCP, SDAP, and RRC.

The antennas in 5GNR radios 1001 are wirelessly coupled to 5GNR gNodeBs 411-412 over 5GNR links. Transceivers in 5GNR radios 1001 are coupled to a transceiver in user circuitry 1002. A transceiver in user circuitry 1002 is typically coupled to the user interfaces like displays, controllers, memory, and the like. The CPU in user circuitry 1002 executes the operating system, PHY, MAC, RLC, PDCP, SDAP, and RRC to exchange 5GNR signaling and data with 5GNR gNodeBs 411-412 over 5GNR radio 1001.

In 5GNR radio 1001, the antennas receive wireless signals from 5GNR gNodeBs 411-412 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSP. The DSP transfers corresponding 5GNR symbols to user circuity 1002 over the transceivers. In user circuitry 1002, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data. In 5GNR radio 1001, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5GNR gNodeBs 411-412 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

The RRC in UE 401 attaches to 5GNR gNodeB 411 over 5GNR radio 1001. 5GNR gNodeB 411 signals the RRC in UE 401 to use the DNNs, slice IDs, QFIs, network addresses, and the like. The SDAP in UE 401 and 5GNR gNodeB 411 exchange user data for DNNs A and B over radio 1001. Eventually, UE 401 physically moves from tracking area #1 to tracking area #2 while in idle mode. In response to the move and corresponding loss of signal strength, 5GNR gNodeB 411 hands UE 401 over to 5GNR gNodeB 412. UE 401 receives and processes broadcast signals from 5GNR gNodeBs 411-412 to detect the physical move from tracking area #1 to tracking area #2. In response to the change in tracking areas, the RRC in UE 401 transfers a tracking area update to AMF 421 over 5GNR radio 1001 and gNodeB 412 that indicates new tracking area #2 for UE 401. After DNN reattachment, 5GNR gNodeB 412 signals the RRC in UE 401 to use the DNNs, slice IDs, QFIs, network addresses, and the like. UE 401 enters active mode on DNNs A and B. The SDAP in UE 401 and 5GNR gNodeB 412 exchange user data for DNNs A and B over 5GNR radio 1001.

Figure 11:
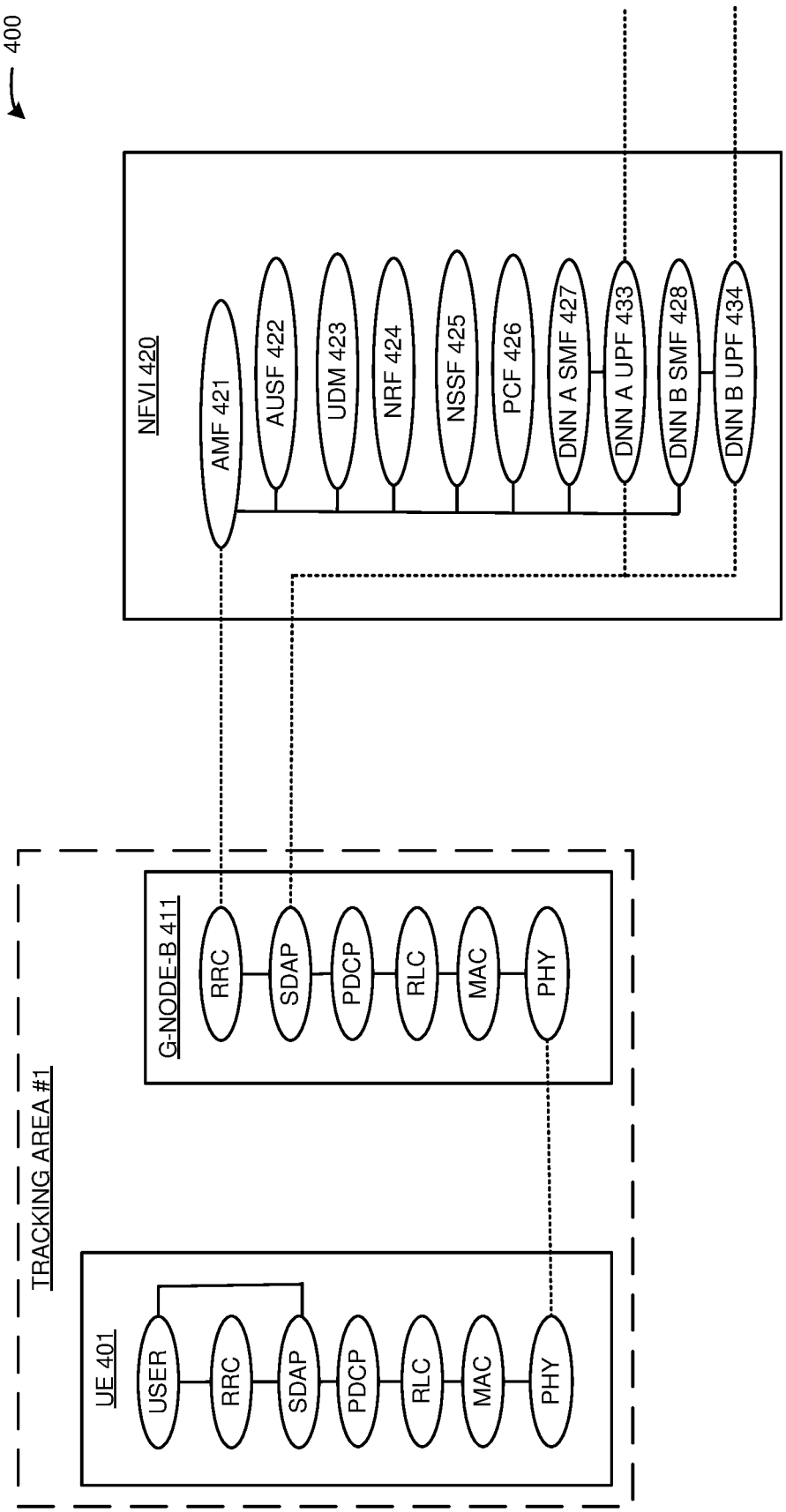
FIG. 11 illustrates an exemplary operation of the 5G communication network to serve the wireless UE based on the DNNs and the tracking areas.

FIG. 11 illustrates an exemplary operation of 5G communication network 400 to serve wireless UE 401 based on the DNNs and the tracking areas. The illustrated operation is exemplary and may vary in other examples. The RRC in 5GNR gNodeB 411 broadcasts a signal that indicates tracking area #1. The RRC in UE 401 attaches to the RRC in 5GNR gNodeB 411. The RRC in 5GNR gNodeB 411 selects AMF 421 for UE 401 based on the UE's location in tracking area #1. The RRC in 5GNR gNodeB 411 transfers initial UE signaling for UE 401 to AMF 421. To authenticate UE 401, AMF 421 interacts with AUSF 422 which interacts with UDM 423 to challenge and verify the identity of UE 401 over the RRC in 5GNR gNodeB 411 and UE 401.

AMF 421 interacts with UDM 423 to obtain subscription data for UE 401 like DNNs and SSC mode. In this example, UE 401 uses SCC mode 1 and DNNs A and B. AMF 421 interacts with NSSF 423 to obtain slice data for the DNNs for UE 401 like prioritized and authorized slice IDs per DNN. AMF 421 interacts with NRF 424 to select PCF 426 based on the DNNs and slice IDs. AMF 421 interacts with PCF 426 to obtain policy data for UE 401, the DNNs, and slice IDs like Quality-of-Service Flow Indicators (QFIs).

AMF 421 interacts with NRF 424 to select SMF 427 for DNN A based on the ID for DNN A and the location of UE 401 in tracking area #1. SMF 427 interacts with NRF 424 to select UPF 433 for DNN A based on the ID for DNN A and the location of UE 401 in tracking area #1. SMF 427 allocates a network address for DNN A to UE 401. SMF 427 directs UPF 433 to serve UE 401 over 5GNR gNodeB 411 for DNN A per its slice ID, QFI, network address, and the like. AMF 421 interacts with NRF 424 to select SMF 428 for DNN B based on the ID for DNN B and the location of UE 401 in tracking area #1. SMF 428 interacts with NRF 424 to select UPF 434 for DNN B based on the ID for DNN B and the location of UE 401 in tracking area #1. SMF 428 allocates a network address for DNN B to UE 401. SMF 428 directs UPF 434 to serve UE 401 over 5GNR gNodeB 411 for DNN B per its slice ID, QFI, network address, and the like. AMF 421 directs the RRC in 5GNR gNodeB 411 to serve UE 401 using the DNNs, slice IDs, QFIs, network addresses, and the like. The RRC in 5GNR gNodeB 411 signals the RRC in UE 401 to use the DNNs, slice IDs, QFIs, network addresses, and the like.

The user applications and SDAP in UE 401 exchange user data. The SDAP in UE 401 and 5GNR gNodeB 411 exchange corresponding user data for DNN A and DNN B. The SDAP in 5GNR gNodeB 411 and UPF 433 exchange the user data for DNN A using its slice ID, QFI, network address, and the like. The SDAP in 5GNR gNodeB 411 and UPF 434 exchange the user data for DNN B using its slice ID, QFI, network address, and the like. UPFs 433-434 typically exchange at least some of the user data for DNNs A and B with external systems.

UE 401 may move about and communicate with other wireless access nodes that are not shown. Eventually, UE 401 the RRC in UE 401 enters idle mode with the RRC in 5GNR gNodeB 411. UE 401 physically moves from tracking area #1 to tracking area #2. In response to the move and corresponding loss of signal strength, the RRC in gNodeB 411 hands UE 401 over to the RRC in 5GNR gNodeB 412 as depicted in FIG. 12.

Figure 12:
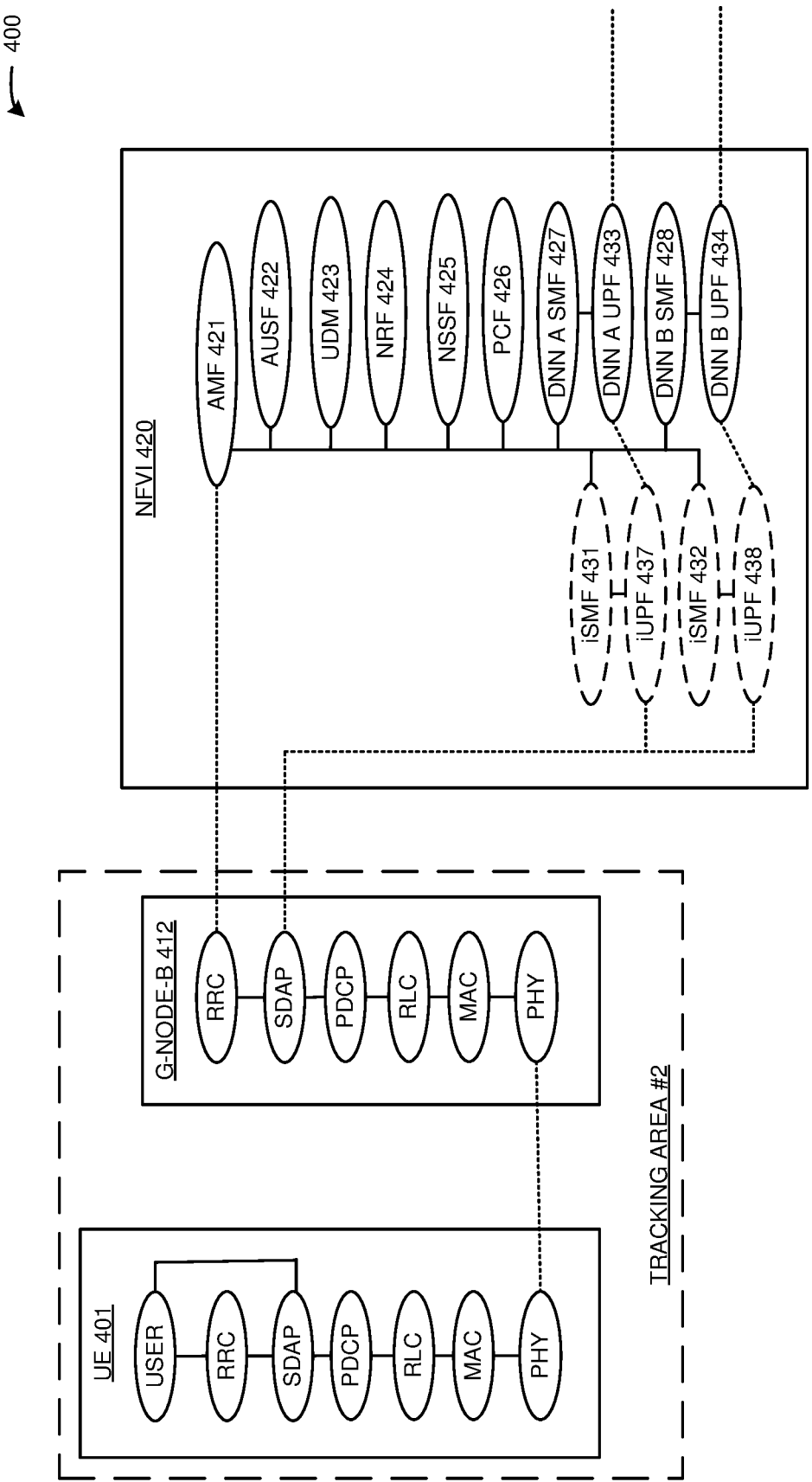
FIG. 12 illustrates an exemplary operation of the 5G communication network to serve the wireless UE based on the DNNs and the tracking areas.

FIG. 12 illustrates an exemplary operation of 5G communication network 400 to serve wireless UE 401 based on the DNNs and the tracking areas. The illustrated operation is exemplary and may vary in other examples. The RRC in 5GNR gNodeB 412 broadcasts a signal that indicates tracking area #2. UE 401 physically moves from tracking area #1 to tracking area #2. In response to the move and corresponding loss of signal strength, the RRC in gNodeB 411 hands UE 401 over to the RRC in 5GNR gNodeB 412. The RRC in UE 401 attaches to the RRC in 5GNR gNodeB 412. At this point, the status of UE 401 is: SCC mode 1, DNN A, DNN B, and in idle/non-active/non-emergency mode.

The RRC in UE 401 receives and processes the tracking area broadcasts to detect its physical move from tracking area #1 to tracking area #2. In response to the change in tracking areas, the RRC in UE 401 transfers a tracking area update to AMF 421 over N1 signaling through the RRC in 5GNR gNodeB 412 to indicate tracking area #2 for UE 401. 5GNR gNodeB 412 is unable to readily communicate with UPFs 433-434 due to the use of different physical and/or virtual platforms. For example, 5GNR gNodeB 412 and UPFs 433-434 may lack a secure backhaul tunneling mechanism. In response, AMF 421 inserts iSMF 431 between SMF 427 and UPF 433 for DNN A and inserts iSMF 433 between SMF 428 and UPF 434 for DNN B. iSMF 431 inserts iUPF 437 between 5GNR gNodeB 412 and UPF 433 for DNN A. iSMF 432 inserts iUPF 438 between 5GNR gNodeB 412 and UPF 434 for DNN B. AMF 421 may use NRF 424 to select iSMFs 431-432, and iSMFs 431-432 may use NRF 424 to select iUPFs 437-438 based on DNNs A and B and tracking area #2.

In response to the iSMF and iUPF insertion while UE 401 remains in idle mode, AMF 421 notifies PCF 423 over the N15 interface of the iSMF/iUPF insertions for DNNs A and B while UE 401 is idle using SCC mode 1. In response to the notification, PCF 426 transfers a reattach instruction for UE 401 and DNN A to SMF 427 and transfers a reattach instruction for UE 401 and DNN B to SMF 428. PCF 426 may host a data structure that correlates individual DNNs and tracking areas with their specific reattach/no-reattach instructions. The use of the data structure to possibly reattach an individual DNN may be conditioned on additional factors like iSMF insertion, SSC mode, and idle/emergency/active mode. SMF 427 transfers the reattach instruction for DNN A in N1 signaling to the RRC in UE 401 over AMF 421 and the RRC in 5GNR gNodeB 412. SMF 428 transfers the reattach instruction for DNN B in N1 signaling to the RRC in UE 401 over AMF 421 and the RRC in 5GNR gNodeB 412. In response, the RRC in UE 401 transfers reattach requests for DNNs A and B to the RRC in 5GNR gNodeB 412. 5GNR gNodeB 412 transfers the reattach requests for DNNs A and B for UE 401 to AMF 421.

In response to the reattach requests, AMF 421 interacts with NRF 424 to select SMF 429 for UE 401 and DNN A based on DNN A, the location of UE 401 in tracking area #2, idle mode (including non-active and non-emergency modes), SCC mode 1, and possibly other factors. AMF 421 interacts with NRF 424 to select SMF 430 for UE 401 and DNN B based on DNN B, the location of UE 401 in tracking area #2, idle mode (including non-active and non-emergency modes), SCC 1, and possibly other factors. SMF 429 interacts with NRF 424 to select UPF 435 for DNN A based on DNN A and the location of UE 401 in tracking area #1. SMF 430 interacts with NRF 424 to select UPF 436 for DNN B based on DNN B and the location of UE 401 in tracking area #2. AMF 421 replaces iSMF 431 and SMF 427 with SMF 429. AMF 421 replaces iSMF 432 and SMF 428 with SMF 430. AMF 421 replaces iUPF 437 and UPF 433 with UPF 435. AMF 421 replaces iUPF 438 and UPF 434 with UPF 436. This new 5G network configuration is shown in FIG. 13.

Figure 13:
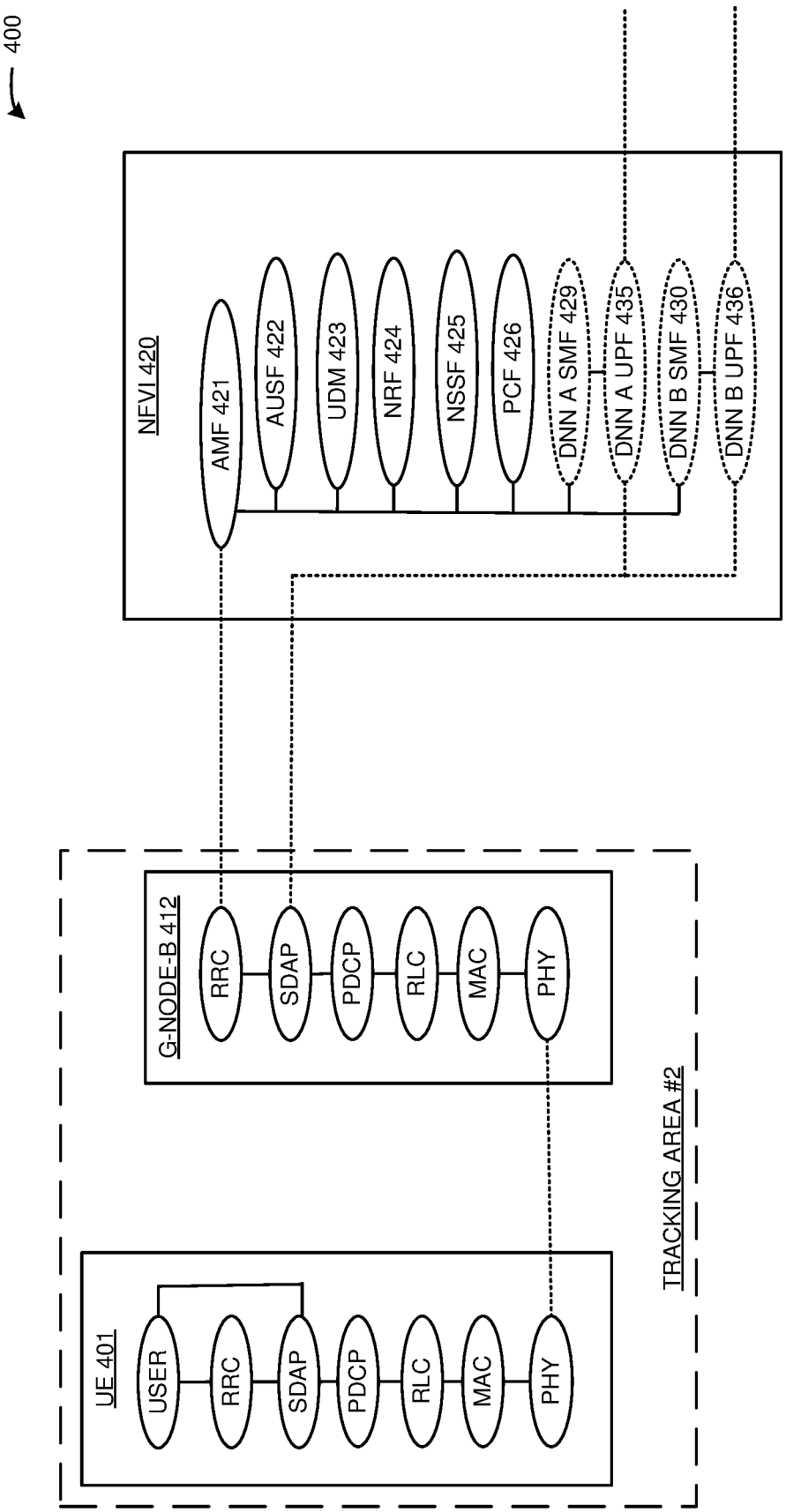
FIG. 13 illustrates an exemplary operation of the 5G communication network to serve the wireless UE based on the DNNs and the tracking areas.

FIG. 13 illustrates an exemplary operation of 5G communication network 400 to serve wireless UE 401 based on the DNNs and the tracking areas. The illustrated operation is exemplary and may vary in other examples. AMF 421 in NFVI 420 has replaced iSMF 431 and SMF 427 with SMF 429. NFVI 420 has replaced iSMF 432 and SMF 428 with SMF 430. NFVI 420 has replaced iUPF 437 and UPF 433 with UPF 435. NFVI 420 has replaced iUPF 438 and UPF 434 with UPF 436.

AMF 421 interacts with NSSF 423 to obtain slice data for DNNs A and B for UE 401 like prioritized and authorized slice IDs per DNN. AMF 421 interacts with NRF 424 to select PCF 426 based on DNNs A and B and their slice IDs. AMF 421 interacts with PCF 426 to obtain policy data for UE 401 like QFIs. SMF 429 allocates a network address for DNN A to UE 401. SMF 429 directs UPF 435 to serve UE 401 over 5GNR gNodeB 412 for DNN A per its slice ID, QFI, network address, and the like. SMF 430 allocates a network address for DNN B to UE 401. SMF 430 directs UPF 436 to serve UE 401 over 5GNR gNodeB 412 for DNN B per its slice ID, QFI, network address, and the like. AMF 421 directs the RRC in 5GNR gNodeB 412 to serve UE 401 using the DNNs, slice IDs, QFIs, network addresses, and the like. The RRC in 5GNR gNodeB 412 signals the RRC in UE 401 to use the DNNs, slice IDs, QFIs, network addresses, and the like.

The user applications and SDAP in UE 401 exchange user data. The SDAP in UE 401 and the SDAP in 5GNR gNodeB 412 exchange corresponding user data for DNN A and DNN B. The SDAP in 5GNR gNodeB 412 and UPF 435 exchange the user data for DNN A using its slice ID, QFI, network address, and the like. The SDAP in 5GNR gNodeB 412 and UPF 436 exchange the user data for DNN B using its slice ID, QFI, network address, and the like. UPFs 435-436 typically exchange at least some of the user data for DNNs A and B with external systems.

The wireless data network circuitry described above comprises computer hardware and software that form special-purpose network circuitry to serve wireless UEs based on the DNNs and the geographic areas. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on the DNNs and the geographic areas.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a User Equipment (UE) based on a Data Network Name (DNN), the method comprising:
    an Access and Mobility Management Function (AMF) receiving initial signaling for the UE and selecting a current Session Management Function (SMF) to serve the UE for the DNN responsive to the initial signaling;
    the current SMF serving the UE for the DNN;
    the AMF detecting when the UE enters a geographic area while using the DNN;
    the current SMF transferring a wireless reattach instruction for the DNN to the UE responsive to the detection of the UE entering the geographic area while using the DNN;
    the AMF receiving new signaling for the UE responsive to the wireless reattach instruction and selecting a new SMF to serve the UE for the DNN responsive to the new signaling; and
    the new SMF serving the UE for the DNN.

2. The method of claim 1 further comprising:
    the current SMF selecting a current User Plane Function (UPF) for the UE and the DNN and controlling the current UPF;
    the current UPF exchanging user data for the UE and the DNN responsive to the control from the current SMF;
    the new SMF selecting a new UPF for the UE and the DNN and controlling the new UPF; and
    the new UPF exchanging additional user data for the UE and the DNN responsive to the control from the new SMF.

3. The method of claim 1 wherein the AMF detecting when the UE enters the geographic area while using the DNN comprises receiving a Tracking Area Update (TAU) from the UE that indicates a Tracking Area (TA) for the UE.

4. The method of claim 1 wherein the AMF detecting when the UE enters the geographic area while using the DNN and the current SMF transferring the wireless reattach instruction comprises:
    the AMF notifying a Policy Control Function (PCF) responsive to the detection of the UE entering the geographic area while using the DNN;
    the PCF directing the current SMF to transfer the wireless reattach instruction for the DNN to the UE responsive to the notification from the AMF; and
    the current SMF transferring the wireless reattach instruction for the DNN to the UE in response to the direction from the PCF.

5. The method of claim 1 wherein the AMF detecting when the UE enters the geographic area while using the DNN and the current SMF transferring the wireless reattach instruction comprises:
    the AMF detecting when the UE enters the geographic area while using the DNN in non-active mode; and
    the current SMF transferring the wireless reattach instruction for the DNN to the UE responsive to the detection of the UE entering the geographic area while using the DNN in the non-active mode.

6. The method of claim 1 wherein the AMF detecting when the UE enters the geographic area while using the DNN and the current SMF transferring the wireless reattach instruction comprises:
    the AMF detecting when the UE enters the geographic area while using the DNN in non-emergency mode; and
    the current SMF transferring the wireless reattach instruction for the DNN to the UE responsive to the detection of the UE entering the geographic area while using the DNN in the non-emergency mode.

7. The method of claim 1 wherein the AMF detecting when the UE enters the geographic area while using the DNN and the current SMF transferring the wireless reattach instruction comprises:
    the AMF detecting when the UE enters the geographic area while using the DNN in idle mode; and
    the current SMF transferring the wireless reattach instruction for the DNN to the UE responsive to the detection of the UE entering the geographic area while using the DNN in the idle mode.

8. The method of claim 1 wherein the AMF detecting when the UE enters the geographic area while using the DNN and the current SMF transferring the wireless reattach instruction comprises:
    the AMF detecting when the UE enters the geographic area while using the DNN in a non-active, non-emergency, idle mode; and
    the current SMF transferring the wireless reattach instruction for the DNN to the UE responsive to the detection of the UE entering the geographic area while using the DNN in the non-active, non-emergency, idle mode.

9. The method of claim 1 wherein the AMF detecting when the UE enters the geographic area while using the DNN and the current SMF transferring the wireless reattach instruction comprises:
    the AMF detecting when the UE enters the geographic area while using the DNN in Session/Service Continuity (SSC) mode 1; and
    the current SMF transferring the wireless reattach instruction for the DNN to the UE responsive to the detection of the UE entering the geographic area while using the DNN in the SSC mode 1.

10. The method of claim 1 wherein the AMF detecting when the UE enters the geographic area while using the DNN and the current SMF transferring the wireless reattach instruction comprises:
    the AMF detecting when the UE enters the geographic area while using the DNN in Session/Service Continuity (SSC) mode 2; and the current SMF transferring the wireless reattach instruction for the DNN to the UE responsive to the detection of the UE entering the geographic area while using the DNN in the SSC mode 2.

11. A wireless communication network to serve a User Equipment (UE) based on a Data Network Name (DNN), the wireless communication network comprising:
   an Access and Mobility Management Function (AMF) configured to receive initial signaling for the UE and select a current Session Management Function (SMF) to serve the UE for the DNN responsive to the initial signaling;
   the current SMF configured to serve the UE for the DNN;
   the AMF configured to detect when the UE enters a geographic area while using the DNN;
   the current SMF configured to transfer a wireless reattach instruction for the DNN to the UE responsive to the detection of the UE entering the geographic area while using the DNN;
   the AMF configured to receive new signaling for the UE responsive to the wireless reattach instruction and select a new SMF to serve the UE for the DNN responsive to the new signaling; and
   the new SMF configured to serve the UE for the DNN.

12. The wireless communication network of claim 11 further comprising:
   the current SMF configured to select a current User Plane Function (UPF) for the UE and the DNN and control the current UPF;
   the current UPF configured to exchange user data for the UE and the DNN responsive to the control from the current SMF;
   the new SMF configured to select a new UPF for the UE and the DNN and control the new UPF; and
   the new UPF configured to exchange additional user data for the UE and the DNN responsive to the control from the new SMF.

13. The wireless communication network of claim 11 wherein the AMF is configured to receive a Tracking Area Update (TAU) from the UE that indicates a Tracking Area (TA) for the UE to detect when the UE enters the geographic area while using the DNN.

14. The wireless communication network of claim 11 wherein:
   the AMF is configured to notify a Policy Control Function (PCF) responsive to the detection of the UE entering the geographic area while using the DNN;
   the PCF is configured to direct the current SMF to transfer the wireless reattach instruction for the DNN to the UE responsive to the notification from the AMF; and
   the current SMF is configured to transfer the wireless reattach instruction for the DNN to the UE in response to the direction from the PCF.

15. The wireless communication network of claim 11 wherein:
   the AMF is configured to detect when the UE enters the geographic area while using the DNN in non-active mode; and
   the current SMF is configured to transfer the wireless reattach instruction for the DNN to the UE responsive to the detection of the UE entering the geographic area while using the DNN in the non-active mode.

16. The wireless communication network of claim 11 wherein:
   the AMF is configured to detect when the UE enters the geographic area while using the DNN in non-emergency mode; and
   the current SMF is configured to transfer the wireless reattach instruction for the DNN to the UE responsive to the detection of the UE entering the geographic area while using the DNN in the non-emergency mode.

17. The wireless communication network of claim 11 wherein:
   the AMF is configured to detect when the UE enters the geographic area while using the DNN in idle mode; and
   the current SMF is configured to transfer the wireless reattach instruction for the DNN to the UE responsive to the detection of the UE entering the geographic area while using the DNN in the idle mode.

18. The wireless communication network of claim 11 wherein:
   the AMF is configured to detect when the UE enters the geographic area while using the DNN in a non-active, non-emergency, idle mode; and
   the current SMF is configured to transfer the wireless reattach instruction for the DNN to the UE responsive to the detection of the UE entering the geographic area while using the DNN in the non-active, non-emergency, idle mode.

19. The wireless communication network of claim 11 wherein:
   the AMF is configured to detect when the UE enters the geographic area while using the DNN in Session/Service Continuity (SSC) mode 1; and
   the current SMF is configured to transfer the wireless reattach instruction for the DNN to the UE responsive to the detection of the UE entering the geographic area while using the DNN in the SSC mode 1.

20. The wireless communication network of claim 11 wherein:
   the AMF is configured to detect when the UE enters the geographic area while using the DNN in Session/Service Continuity (SSC) mode 2; and
   the current SMF is configured to transfer the wireless reattach instruction for the DNN to the UE responsive to the detection of the UE entering the geographic area while using the DNN in the SSC mode 2.

* * * * *